United States Patent
McBride et al.

(10) Patent No.: US 11,834,557 B2
(45) Date of Patent: Dec. 5, 2023

(54) MODIFIERS FOR LUXURY VINYL TILE TO INCREASE HARDNESS AND RIGIDITY

(71) Applicant: LANXESS Corporation, Pittsburgh, PA (US)

(72) Inventors: Emily McBride, Kalama, WA (US); Karena Kaye Linkenhoger, Dallas, TX (US); Bradley Les Farrell, Vancouver, WA (US); Kyle Jeffrey Posselt, Woodland, WA (US); William D. Arendt, Libertyville, IL (US)

(73) Assignee: LANXESS Corporation, Pittsburgh, PA (US)

( * ) Notice: Subject to any disclaimer, the term of this patent is extended or adjusted under 35 U.S.C. 154(b) by 0 days.

(21) Appl. No.: 17/254,599

(22) PCT Filed: Jun. 28, 2019

(86) PCT No.: PCT/US2019/039884
§ 371 (c)(1),
(2) Date: Dec. 21, 2020

(87) PCT Pub. No.: WO2020/006450
PCT Pub. Date: Jan. 2, 2020

(65) Prior Publication Data
US 2021/0340339 A1 Nov. 4, 2021

Related U.S. Application Data

(60) Provisional application No. 62/691,256, filed on Jun. 28, 2018.

(51) Int. Cl.
| | | |
|---|---|---|
| *C08J 3/20* | (2006.01) | |
| *C08J 3/18* | (2006.01) | |
| *C08K 5/12* | (2006.01) | |
| *E04F 15/10* | (2006.01) | |

(52) U.S. Cl.
CPC . *C08J 3/20* (2013.01); *C08J 3/18* (2013.01); *C08K 5/12* (2013.01); *C08J 2327/06* (2013.01); *E04F 15/105* (2013.01)

(58) Field of Classification Search
CPC ..... C08J 3/12; C08J 3/08; C08J 3/203; C08K 3/04; C08K 3/08; C08K 3/34; C08K 3/013; C08K 3/014; C08K 13/02; B33Y 10/00; B33Y 70/00; B33Y 80/00; B29K 2105/251; B32B 27/304; B32B 27/08; B32B 27/20; B32B 27/22; E04F 15/00; E04F 15/107
See application file for complete search history.

(56) References Cited

U.S. PATENT DOCUMENTS

| | | |
|---|---|---|
| 6,576,577 B1 | 6/2003 | Garner |
| 6,599,599 B1 | 7/2003 | Buckwater et al. |
| 6,746,756 B2 | 6/2004 | Simon et al. |
| 7,902,286 B2 | 3/2011 | Tresino |
| 8,283,411 B2 | 10/2012 | Gosse et al. |
| 8,653,184 B2 | 2/2014 | Gosse et al. |
| 9,034,982 B2 | 5/2015 | Andjelkovic et al. |
| 9,156,233 B2 | 10/2015 | Dossche et al. |
| 9,758,637 B2 | 9/2017 | Arendt et al. |
| 10,214,628 B2 | 2/2019 | Arendt et al. |
| 2005/0176321 A1 | 8/2005 | Crette et al. |
| 2007/0037926 A1* | 2/2007 | Olsen ............. C08K 5/092 524/297 |
| 2013/0274396 A1* | 10/2013 | Arendt ............. C08K 5/0016 106/505 |
| 2014/0352248 A1 | 12/2014 | Whispell et al. |
| 2015/0047282 A1 | 2/2015 | Ford et al. |
| 2016/0017119 A1 | 1/2016 | Arendt et al. |
| 2016/0326347 A1 | 11/2016 | Wagner et al. |
| 2017/0044778 A1 | 2/2017 | Brickner et al. |
| 2017/0145186 A1 | 5/2017 | Pfeiffer et al. |
| 2018/0038115 A1 | 2/2018 | Cappelle |
| 2018/0118920 A1 | 5/2018 | Kim et al. |
| 2018/0135313 A1* | 5/2018 | Chen ............. B32B 27/20 |
| 2019/0126595 A1 | 5/2019 | Chen et al. |
| 2021/0198449 A1 | 7/2021 | Schilling, III |

FOREIGN PATENT DOCUMENTS

| | | |
|---|---|---|
| EP | 2810982 A1 | 12/2014 |
| WO | 2014011110 A1 | 1/2014 |
| WO | 2015106095 A1 | 7/2015 |
| WO | 2017027155 A1 | 2/2017 |
| WO | 2017087435 A1 | 5/2017 |

OTHER PUBLICATIONS

Supplementary European Search Report from corresponding European Application No. 19826659, dated Feb. 1, 2022, four pages.

* cited by examiner

*Primary Examiner* — Jane L Stanley
(74) *Attorney, Agent, or Firm* — Nicanor A. Kohncke; Christopher L. McDavid; Alyson J. DiLena

(57) ABSTRACT

Modifiers for use in vinyl flooring applications reduce or eliminate the need for traditional, general-purpose plasticizers in applications that require increased hardness or rigidity. High solvating, fast fusing modifiers, such as dibenzoates, added to LVT formulations provide unexpectedly increased flexural strength, hardness, indentation resistance and deflection not heretofore known or recognized in luxury vinyl tile formulations.

16 Claims, 19 Drawing Sheets

Wear layer hardness at 10 second models for both X-4250 and X-4100

Tensile strength models for both X-4250 and X-4100

MODIFIERS FOR LUXURY VINYL TILE TO INCREASE HARDNESS AND RIGIDITY

FIELD OF THE INVENTION

This invention is directed to modifiers for use in luxury vinyl tile applications, in particular, modifiers used to increase hardness, strength or rigidity. The invention is also directed to a method for modifying certain properties of highly filled luxury vinyl tile through the use of modifier components that replace, in whole or in part, currently used industry standard plasticizers.

BACKGROUND OF THE INVENTION

Vinyl flooring systems are well known in the art. Vinyl flooring systems are available in rolls, tile and planks. Certain vinyl flooring systems differ from standard vinyl flooring in their ability to closely mimic the look and feel of natural materials, such as wood or stone. These vinyl flooring systems are known as luxury vinyl tile ("LVT"). LVT has photo-realistic images combined with textures that resemble those of the real materials. This is generally accomplished by use of a surface layer over a number of other layers. LVT panels have decorative patterns on the visible surface to provide an aesthetically pleasing appearance, along with other layers for strength, durability, and wear and water resistance.

While LVT is more expensive than standard vinyl tile, it has an advantage of being frequently (but not always) less expensive when compared to wood, stone, and ceramic tile options. LVT is increasingly used in higher end flooring applications. This type of flooring tends to be lighter and easier to install than other flooring materials and is more resistant to scuffs and stains.

Luxury vinyl flooring also differs from traditional vinyl in appearance. LVT commonly takes on one of two forms. Either it simulates stone (slate, travertine, marble, etc.) or it simulates wood (teak, maple, oak, walnut, pine, etc). Traditional vinyl flooring sometimes imitates natural materials and sometimes does not. Another thing that distinguishes luxury vinyl tile (LVT) is the shape of the individual pieces. Traditional sheet vinyl flooring comes in room-widths or certain lengths to minimize or even eliminate seams. Normal vinyl tiles are usually square, e.g., 12"×12". Because LVT often imitates solid wood flooring, it comes in plank shapes. In this respect, LVT and laminate flooring are the same. Sizes vary, but the general shape is long and narrow. A typical size is 7" wide by 48" long.

Both traditional and luxury vinyl tile commonly have four layers that include a top polyurethane layer that prevents light scratching and shoe scuffing, a clear film layer that protects against rips and tears, a design layer, i.e., a print of stone or wood, and a backing layer that provides structure and solidity. Other layers may be included for sound dampening, rigidity, or for interlocking tiles.

Luxury vinyl is generally considered to be a "soft" floor being made entirely from vinyl, fillers, and other additives as needed for performance, such as plasticizers and heat stabilizers. It is generally known that plasticizers make a vinyl polymer softer and more workable, in addition to lowering the melt viscosity during manufacturing. Traditionally, the manufacture of LVT from PVC requires the use of a plasticizer.

A variety of plasticizers are known in the art. With respect to vinyl flooring in particular, general-purpose plasticizers are traditionally used and, in this group, (ortho-, or more commonly, terephthalate esters are the most widely used plasticizers. The addition of phthalates to PVC makes a hard plastic more flexible and durable, and also eases manufacturing by reducing melt viscosity. Due to newer, more efficient LVT processing equipment, lower temperature processing conditions provided by higher solvating, more expensive, plasticizers are not generally required.

It is common for PVC products to contain up to 50 percent by weight of plasticizers and commonly include a phthalate as a general purpose plasticizer. Lower amounts are used in some applications such as flooring. A common terephthalate, dioctyl terephthalate (DOTP), is an industry standard. DOTP is available from multiple suppliers and is inexpensive as compared to other available plasticizers for use in flooring applications. Diisononyl phthalate (DINP) is an inexpensive ortho-phthalate which may also be used.

Use of ortho-phthalate plasticizers is not without disadvantages, however. Some ortho-phthalates have been identified as reproductive and developmental toxins. Plasticizers are not chemically bound to the PVC so, over time, leaching or migration of the plasticizer may occur, which alters the properties of the LVT and could potentially add to health or indoor air quality concerns.

Non-phthalate plasticizers for use in flooring applications are also known. One example of a non-phthalate plasticizer is diisononyl cyclohexane-1,2-dicarboxylate (available as Hexamoll® DINCH®) as described in U.S. Patent Publication No. 2017/0145186.

Because vinyl flooring materials are not as rigid as wood, ceramic tile and stone, imperfections from the subfloor may also be visible on the floor surface, destroying its aesthetics. Dents from wear over time, such as high-heeled shoes, heavy furniture, and other uses also detract from the appearance of LVT. In addition, strength of adhesive, when used with vinyl floors, may be compromised by moisture that infiltrates LVT joints due to the lack of rigidity, or that is introduced by transfer through substrates such as concrete. Surface coverings using no adhesive or grout have been developed with tongue and groove profiles; however, there may be a lack of joint strength depending on the configuration of the tongue and groove.

To address lack of rigidity and to improve moisture resistance, application of waterproofing materials and silicone caulking to seal voids has been implemented. These steps add time to installation and cost of manufacture and are not completely effective. A wide variety of underlayment materials have also been developed to serve as a cushion to the vinyl floor system to compensate for imperfections in the surface of the subfloor. While effective in part, these materials are not totally effective in reducing the transmission of sound through the floor and add difficulty and complexity to the installation process. They also do little to improve dent resistance. Novel tongue and groove configurations have also been developed to improve the rigidity of the LVT joint, making it more similar to wood in appearance and installation. In efforts to create a harder, more durable product, filler loadings may be increased. Other efforts to increase rigidity include decreasing or eliminating plasticizers in the formulation; this comes at the cost of increasing the processing temperature to mitigate the corresponding increase in melt viscosity.

There remains a need for LVT products having increased hardness or rigidity (stiffness) to improve and sustain durability over the product life span.

A novel method for increasing hardness or rigidity has been discovered based on the use of high-solvating plasticizers, including without limitation certain dibenzoates, as modifiers in an LVT formulation. These dibenzoates, which are known typically as plasticizers, unexpectedly result in a harder, more rigid LVT product with improved and sustained durability. In addition, without wishing to be bound by theory, it is believed that the modifiers compatibilize general-purpose plasticizers typically used in LVT formulations, reducing migration into the adhesive, hydrolysis, and creation of odor, delamination and adhesion issues.

While the invention is primarily described in terms of dibenzoate modifiers, use of other high solvating, fast fusing plasticizers is also within the scope of the invention as further discussed herein.

It is an object of the invention to provide a vinyl surface covering that is harder or more rigid than current vinyl surface coverings, including current LVT's, wherein the surface covering reflects unexpected improvements in flexural strength, hardness, indentation resistance, deflection, stain resistance, heat resistance, coefficient of friction and sound dampening.

Another object of the invention is to provide a method for increasing the hardness or rigidity of vinyl surface coverings, such as LVT, to improve and sustain durability over the product life span, by adding certain modifiers to reduce or eliminate the amount of traditional plasticizers used in vinyl formulations.

A further object of the invention is to provide an improved LVT formulation comprising modifiers that achieve improved hardness or rigidity (stiffness) and indentation resistance, among other properties, while eliminating or reducing the need for traditionally used phthalate or other general-purpose plasticizers.

Yet another object of the invention is to provide a floor covering comprising the improved LVT formulations of the invention.

Still another object of the invention is to provide a method for improving the hardness or rigidity of vinyl floor coverings and tile, by incorporating certain modifiers as a replacement for or in addition to general purpose plasticizers traditionally used in vinyl flooring applications, so as not to negatively impact the melt rheology during manufacturing.

Other objects of the invention will be evident to one skilled in the art based upon the disclosure herein.

SUMMARY OF THE INVENTION

This invention is directed to vinyl floor coverings, including without limitation luxury vinyl tile (LVT), specifically formulations for LVT that improve hardness, stiffness (rigidity) and, hence, durability and indentation resistance, of the final product. In particular, the invention is directed to vinyl formulations comprising certain high solvating, fast-fusing modifiers to increase hardness or rigidity of the vinyl floor covering, including without limitation certain dibenzoates and other non-benzoate fast-fusing plasticizers. The invention is also directed to a method for improving the hardness or rigidity of vinyl floor covering by incorporating certain modifiers as a replacement for or in addition to traditional, general purpose ortho- and terephthalate plasticizers that are typically used in vinyl flooring applications.

The invention is described in terms of use of the modifiers in vinyl flooring coverings, but the invention is not limited as such.

The dibenzoate modifiers of the invention include 1,2-propylene glycol dibenzoate (PGDB), diethylene glycol dibenzoate (DEGDB), dipropylene glycol dibenzoate (DPGDB), and mixtures thereof. Other high solvating dibenzoates are also within the scope of the invention, as are other non-benzoate high solvating plasticizers identified herein.

One embodiment of the invention is an LVT formulation comprising the modifiers of the invention, including without limitation certain dibenzoates and other high solvating, fast fusing plasticizers.

A second embodiment of the invention is a method for improving hardness or stiffness of LVT products through the incorporation of the modifiers of the invention into LVT formulations.

A third embodiment is the use of modifiers to eliminate or reduce the load of traditional general purpose plasticizers used in vinyl flooring compositions.

A fourth embodiment of the invention is a floor covering comprising the LVT formulation(s) of the invention.

Other embodiments will be apparent to one skilled in the art based on the disclosure herein.

DETAILED DESCRIPTION OF THE INVENTION

Figure 1:
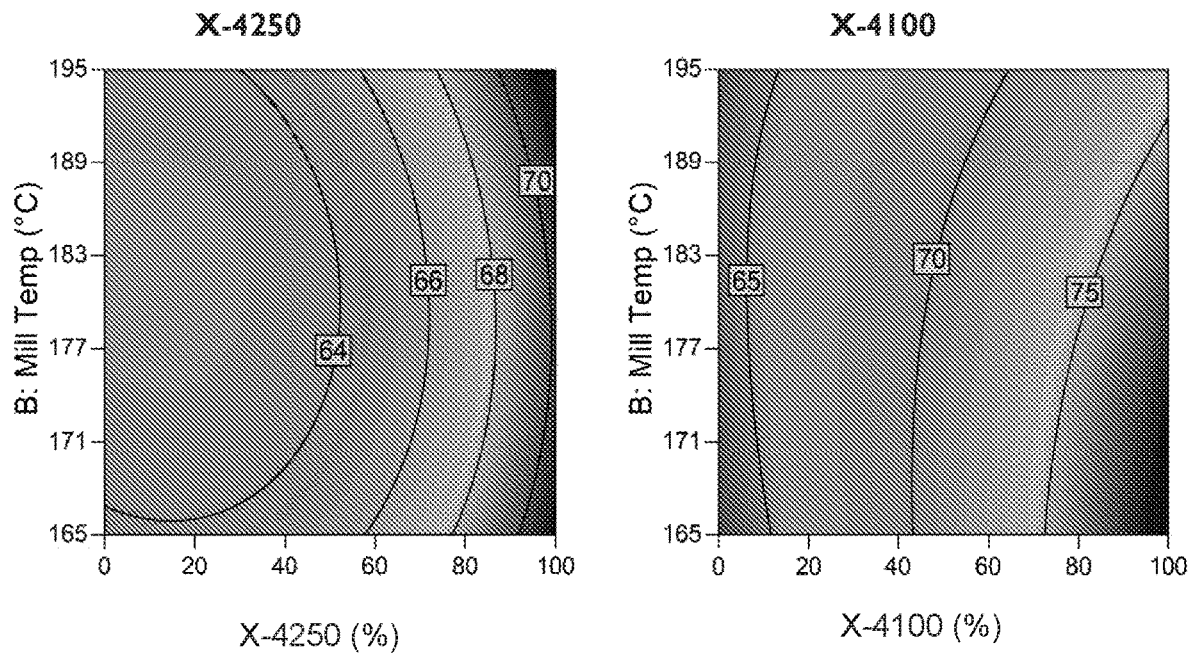
FIG. 1 shows modeling of wear layer hardness in a composite tile for various % of dibenzoate modifiers and various mill temperatures.

This invention is directed to vinyl floor coverings, including luxury vinyl tile (LVT), in particular formulations for LVT that improve hardness or stiffness (rigidity) and, hence, durability of the final product. The invention is also directed to vinyl formulations comprising modifiers to increase hardness or rigidity and indentation resistance of the vinyl floor covering, including without limitation certain dibenzoates and other high-solvating plasticizers. One benefit of replacing a portion of the plasticizer component with the inventive modifiers is that the melt rheology is maintained for easy manufacturing, yet the final product is stiffer. The modifiers of the invention may also provide improvements in coefficient of friction and sound dampening.

The invention is also directed to a method for improving the hardness or rigidity of vinyl floor covering by incorporating certain modifiers as a replacement for or in addition to traditional general-purpose plasticizers used in vinyl flooring applications.

The invention is useful for filled and unfilled layers in vinyl floor coverings. The invention may be used in various layers of vinyl flooring or tiles.

The terms "plasticizer" and "modifier" or "modifier plasticizer" may be used interchangeably herein with respect to the plasticizers used as property modifiers in the invention. The modifiers of the invention are all known as high solvating, fast fusing plasticizers. With respect to the invention, they are used to modify properties as set forth herein. In particular, their use in the vinyl formulations of the invention provided unexpected results that could not have been predicted based on past known use as a plasticizer.

The term "traditional plasticizer" means and includes general purpose and other plasticizers typically used in PVC formulations, including without limitation dioctyl terephthalate, diisononyl phthalate, and diisononyl cyclohexane-1,2-dicarboxylate.

The invention is described in terms of use of the modifier plasticizers in PVC-based vinyl flooring coverings, including PVC homopolymers and copolymers, but the invention is not limited as such. Other polymeric formulations suitable for floor coverings are also within the scope of the invention.

The dibenzoate modifiers of the invention include 1,2-propylene glycol dibenzoate (PGDB), diethylene glycol dibenzoate (DEGDB), and dipropylene glycol dibenzoate (DPGDB), and mixtures thereof. Other high solvating, fast fusing dibenzoate plasticizers may also be used as modifiers in the invention. Suitable non-benzoate, high solvating, fast fusing plasticizers are also within the scope of the invention. These include without limitation: dibutyl terephthalate (DBT), alkylsulfonic phenyl esters (such as Mesamoll® from Lanxess) and Santicizer® P-1400 (benzyl butyl 1,2-cyclohexyldicarboxylate, available from Valtris). Other high solvating, fast fusing plasticizers useful in the invention will be known to those skilled in the art.

Generally, traditional plasticizers were and are used in LVT formulations in amounts ranging between about 5 to about 40 phr, more typically between about 15 and 30 phr, based on 100 parts of PVC or other polymeric resins. The dibenzoate modifiers of the invention are present in the LVT formulations in amounts ranging from about 2 phr to about 35 phr based upon 100 phr of PVC or other polymeric resin, either alone or to offset an equivalent amount of general-purpose plasticizer used in the formulation.

When used in conjunction with general purpose and/or other traditional plasticizers, the inventive modifiers are also described in terms of percentage (%) plasticizer loading, based on the total plasticizer content of the formulation. By way of example, use of 40% modifier means that the balance of 60% is made up of another traditional plasticizer (DOTP in the case of the examples). To determine the phr in an LVT formulation for any given modifier, the modifier percentage (loading) is multiplied by the total plasticizer content (phr) of the particular formulation.

A typical LVT formulation utilizing traditional plasticizers is described in the table below, although formulations containing different components and/or component amounts are known and suitable for the invention.

| Typical LVT Formulation | |
| --- | --- |
| Component | PHR |
| PVC Resin | 100 |
| Calcium Carbonate (filler) | 200 |
| Plasticizers | 30 |
| Carbon Black | 1 |
| Lubricant | 1 |
| Dispersant (Optional) | 4 |

EXAMPLES

Preliminary Evaluations—Dibenzoates Alone Vs. DOTP Alone

Initially, the goal of testing was to determine an appropriate level of dibenzoate loading for use in a luxury vinyl tile (LVT) formulation and the processing conditions for a highly filled LVT sample using dibenzoates as the plasticizer. This would, in turn, provide an understanding of how the dibenzoates perform in highly filled LVT samples and provide benchmarking against an LVT formulation containing DOTP alone.

Test Methodology

Sample Formulation

Solid components mixed in KitchenAid mixer with bowl warmer set to 140° F., liquid components added and mixed at low speed (2) for 10 min.

Melt Compounding

Using a LabTech LRMR-S-150/O 2-roll mill, formulations were charged onto the rollers (initial nip-gap 0.9 mm, 1.1:1 roll speed ratio). Samples were banded immediately after fusing, then calendared for an additional 1 min. Total time on mill was 6 minutes.

Individual Layer Pressing

Using Monarch Series Compression Molding Press and appropriately sized mold for sample (0.105" for base layer and 0.02" for wear layer), at set temperature pressed at low pressure (5 tons) for 3 min, pressed at high pressure (varies) for 2 min.

Composite Pressing

Using Monarch Series Compression Molding Press and both sized molds, at set temperature pressed at low pressure (5 tons) for 5 minutes, pressed at high pressure (varies) for 4.5 min.

Test Methods:

Shore D Hardness—ASTM D-2240

Tensile Strength—ASTM D638, Type IV die, 2 in/min pull rate

Dimensional stability—ASTM F2199

Flexural modulus—ASTM D790-15 (Also used to generate flexural strength and deflection results)

Figure 6:
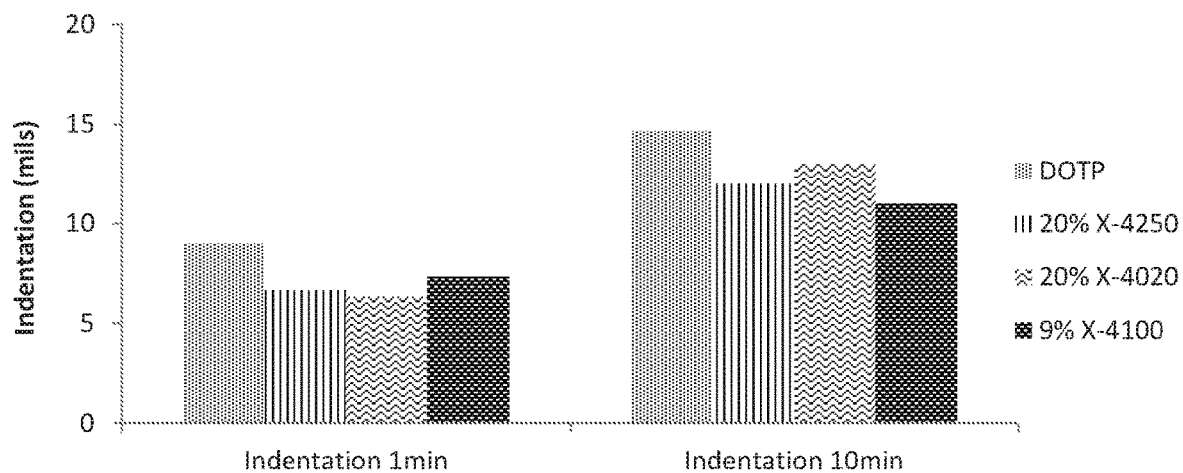
FIG. 6 shows indentation resistance (mils) results at 1 minute and 10 minutes for composite samples comprising DOTP alone and as modified with varying % of dibenzoate modifiers.
Figure 10:
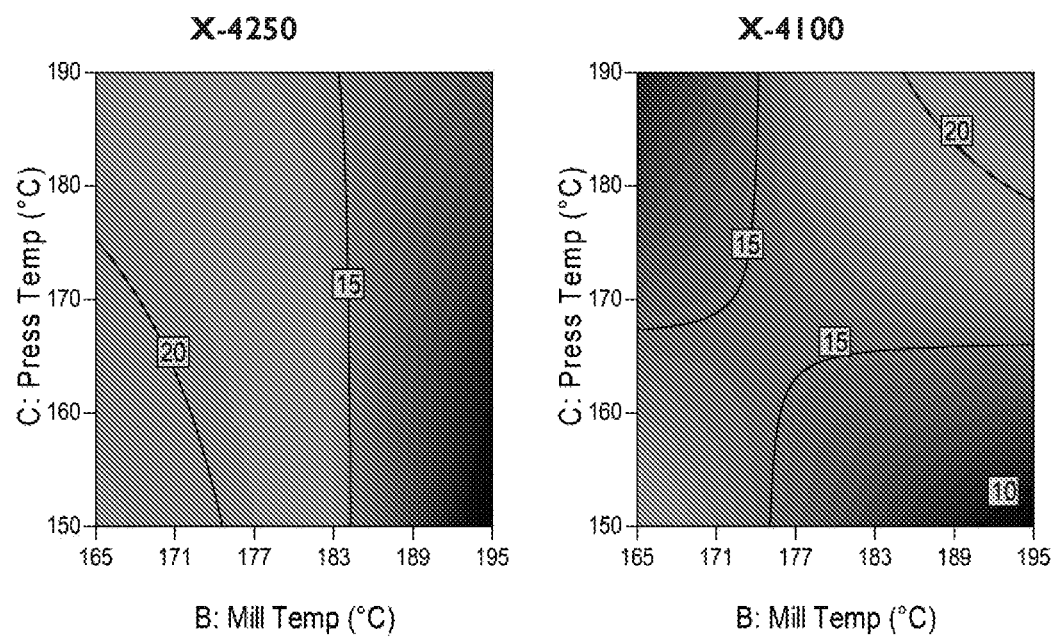
FIG. 10 shows modeling of indentation resistance of wear layers of a composite tile using two different dibenzoates and various press temperatures and mill temperatures.
Figure 11:
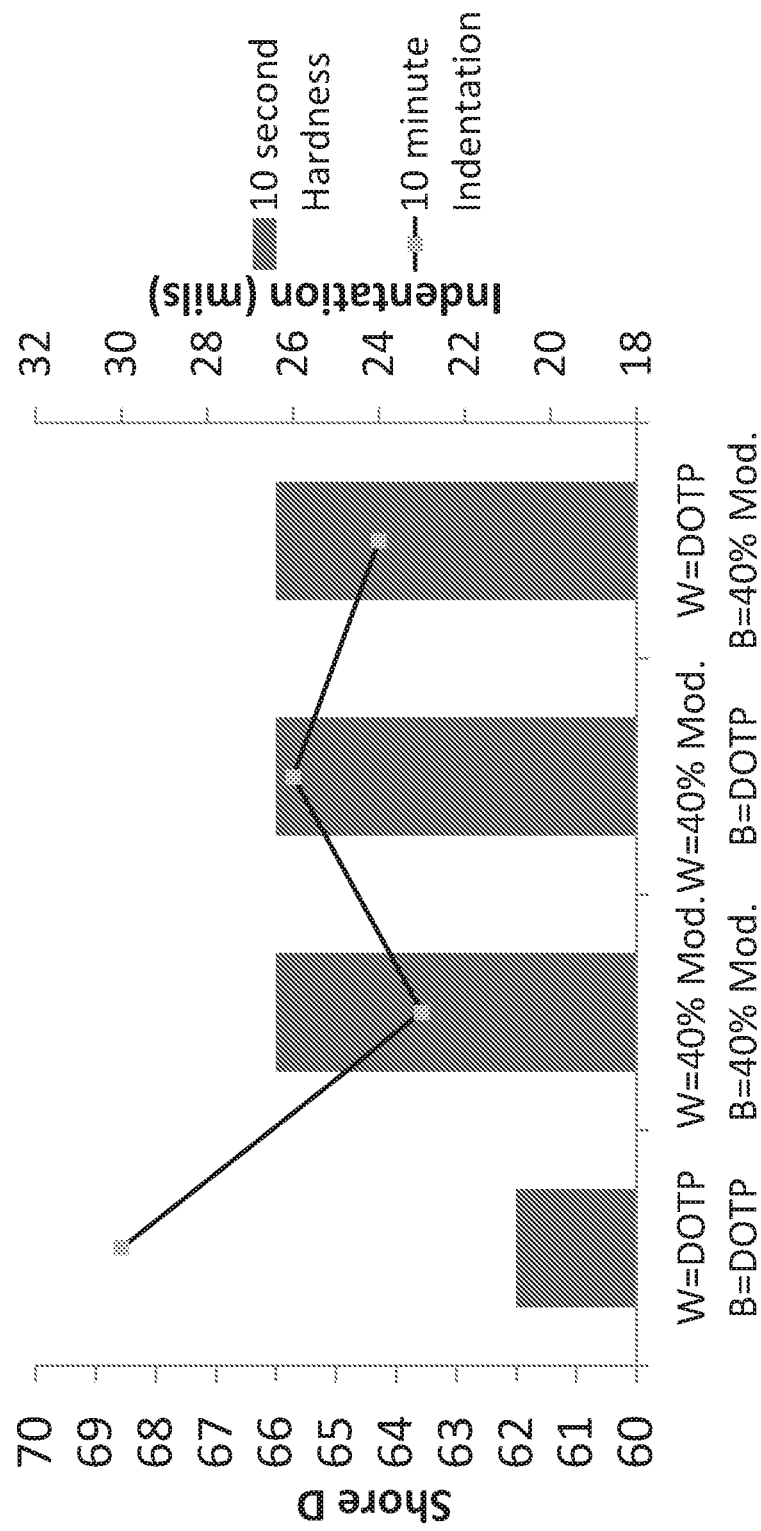
FIG. 11 shows Shore D hardness and indentation values (mils) for samples having a wear layer and a 200 phr base layer using DOTP alone in both layers and combinations of modifier in either or both of the wear and base layer.
Figure 14:
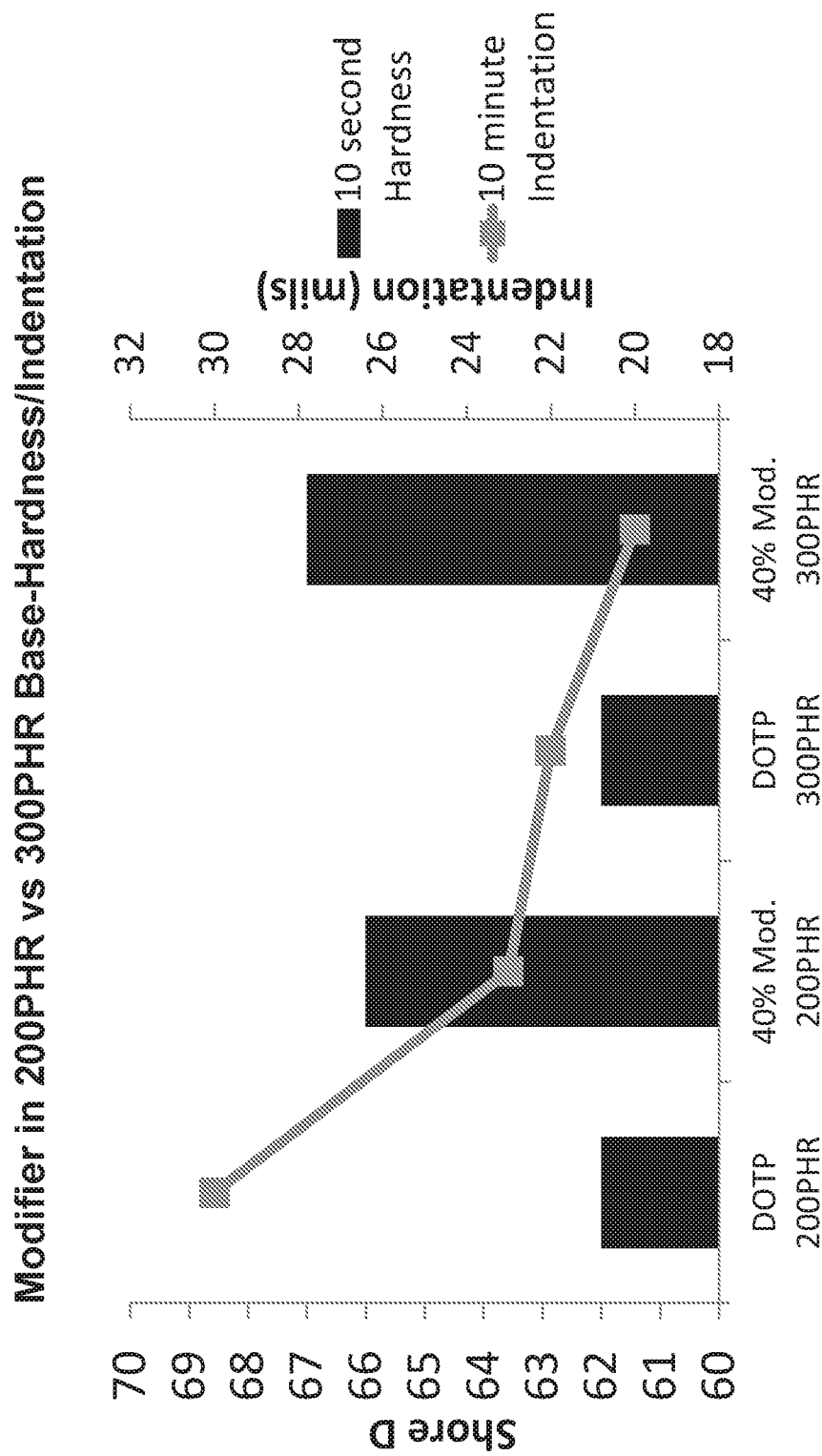
FIG. 14 shows Shore D hardness (10 second) and indentation (mils) (10 minute) values obtained for samples having 200 phr or 300 phr base layers, comparing DOTP alone and as modified with 40% dibenzoate.
Figure 19:
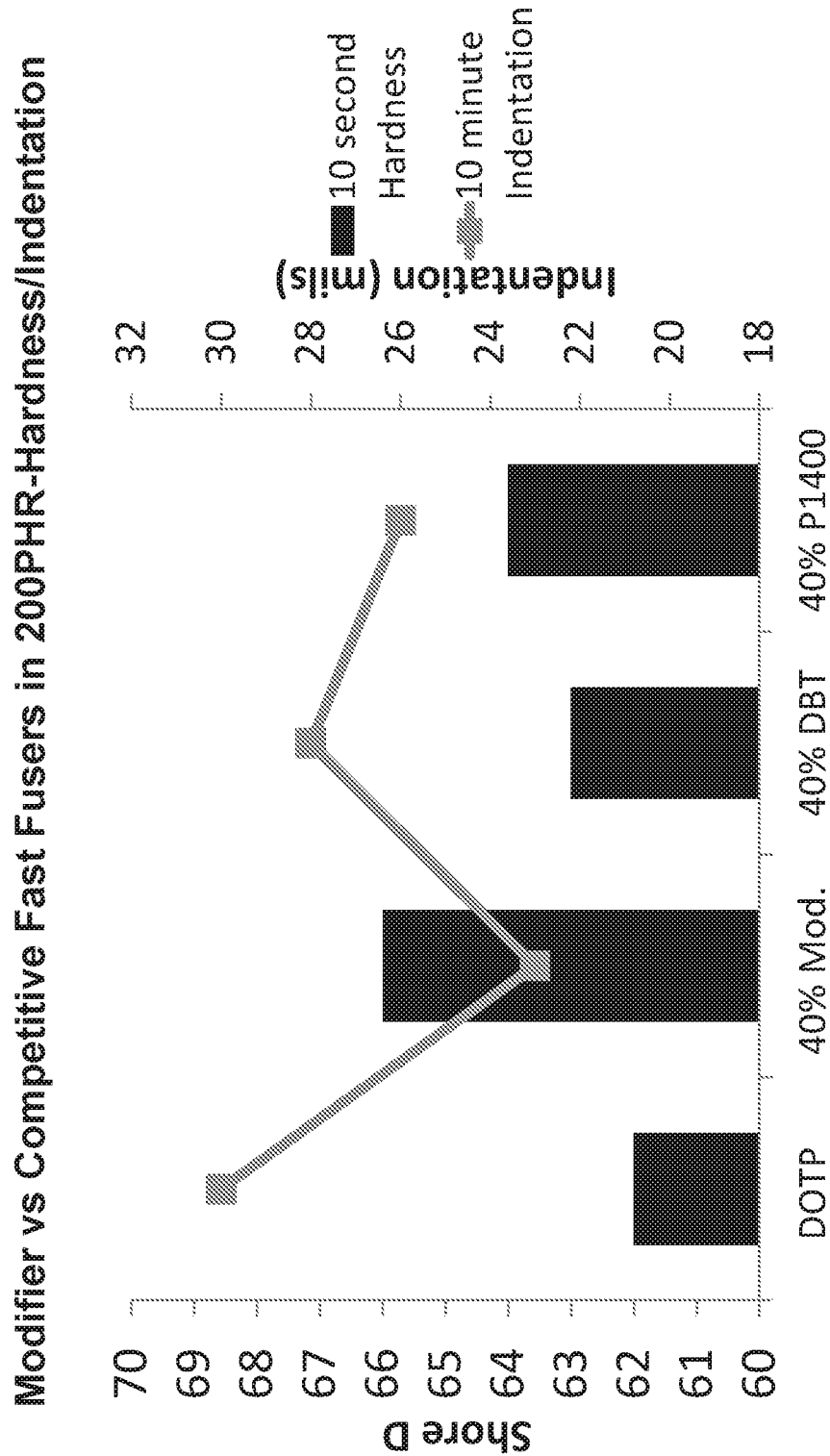
FIG. 19 shows hardness (Shore D) (10 second) and indentation (mils) (10 minute) values for various samples having a 200 phr base, comparing DOTP alone and as modified with fast fusers including 40% dibenzoate, DBT and P1400.
Figure 23:
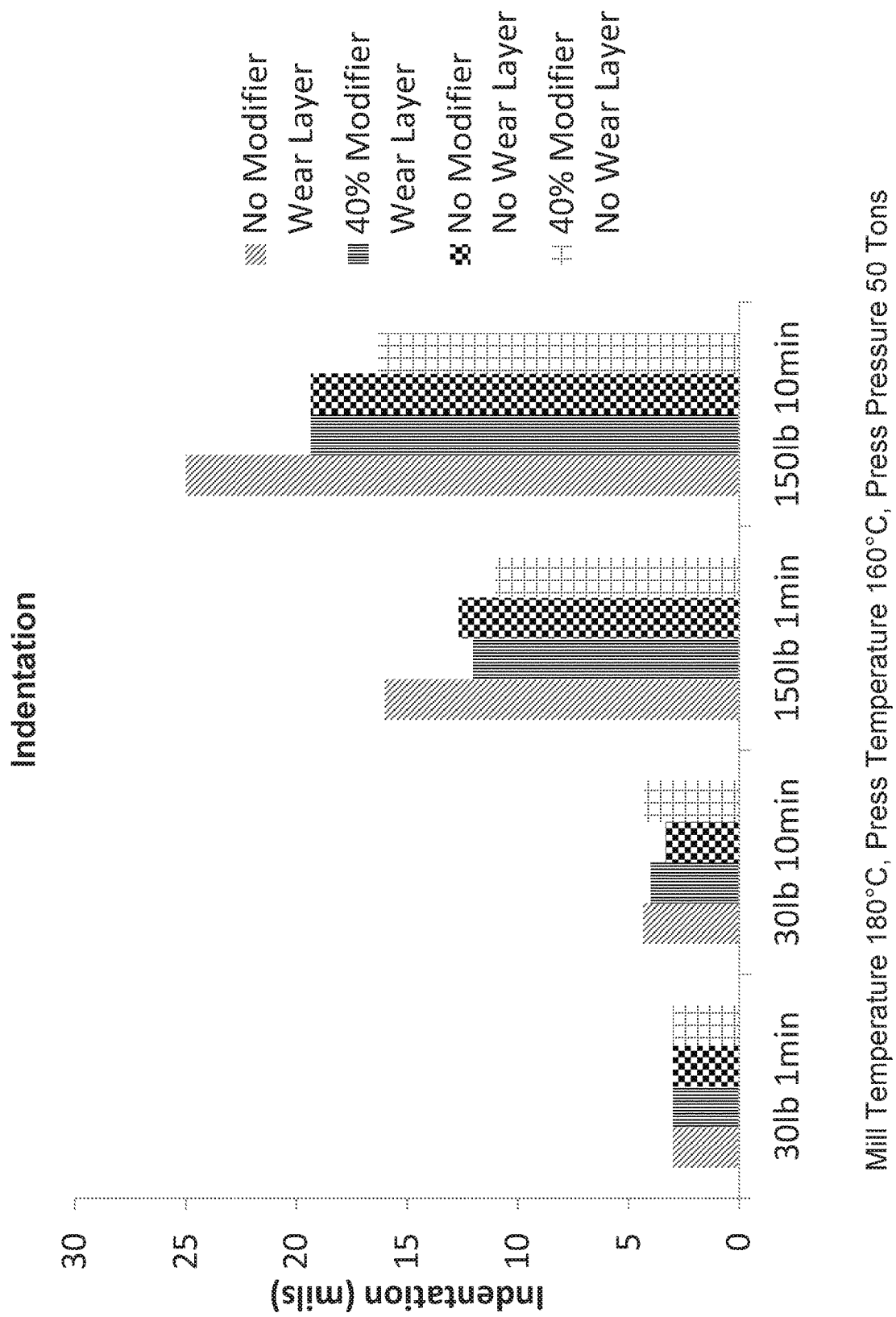
FIG. 23 shows indentation (mils) values for base layer only and composite samples evaluated at specific process conditions, with and without modifier.

Abrasion resistance—Linear Taber abrasor, H-18 wear-aser, 750 g load, 1 in stroke length, 60 cpm and 1000 cycles Indentation resistance—Modified ASTM 1914, used 25 lb., 30 lb. or 150 lb. weight and flat 0.25 inch indenter foot or 0.178 in indenter foot. FIGS. 6 and 10 utilized 25 lb. weight and a 0.25 in indenter foot. FIGS. 11, 14 and 19 used 140 lb. weight with a 0.178 in. indenter foot. FIG. 23 used 30 lb. and 150 lb. weights with a 0.25 in. indenter foot, and 1 minute and 10 minute application times.

Vertical rebound—ASTM D2632

Stain resistance—Samples were stained for 30 minutes (1% oil brown), 1 hour (shoe polish), or 4 hours (mustard, merlot, coffee). Delta (Δ) E was measured using a Color-i7 spectrophotometer.

Heat resistance—ASTM F1514

Curling and water absorption—Cut 2" squares, weighed mass and thickness of each square, placed samples on towel saturated in water, equilibrated for 72 hrs, record change in mass and thickness at corners.

Chemical resistance—ASTM F925

Gloss—Measured 3 points with Micro-TRI-gloss, recorded 60° angle.

Torque and Temperature at fusion—Brabender Intelli-torque Plasticorder was charged with formulations. Samples were ramped at 3° C./min from 25° C. to 200° C. at 63 rpm, damping=1. Measuring head accessory charge mass was calculated to be 70% of total chamber volume.

Plasticizer compatibility—ASTM D2383, at 80° C.

Process Volatility (% Plasticizer Lost)—Individual layers were formulated per paragraph 0070 (sample formulation). Formulation were added to a pre weighed container, and the total formulation added to can is determined. Samples were then milled per paragraph 0070 (melt compounding). All samples were melt compounded at 180° C. Total mass of sample not transferred to the mill (left in the container) was calculated, and the mass of the fused melt compounded sample was determined. The difference between the sample added to mill versus the sample fused determined the mass volatized off during milling. Process volatility was determined by taking the percentage of the mass volatized off versus the amount of sample to be milled.

Plasticizer/Modifier Materials:

DOTP: Dioctyl terephthalate, commercially available from a number of sources

X-4250: A diblend of diethylene glycol dibenzoate (DE-GDB) and dipropylene glycol dibenzoate (DPGDB) (50:50 ratio), PG or X-4100: 1,2-Propylene glycol dibenzoate (PGDB, X-4020: A triblend of 80 wt. % of a 4:1 DEGDB to DPGDB and 20 wt. % of PDGB DBT—Dibutyl terephthalate, commercially available from a number of sources, a competitive high solvating, fast fusing plasticizer P1400, Santicizer P-1400, which is benzyl butyl 1,2-cyclohexyldicarboxylate, a competitive fast fusing material sold by Valtris.

Design of Experiments (DOE). Design of experiments (DOE) is a systematic method to determine the relationship between factors affecting a process and the output of that process. In other words, it is used to find cause-and-effect relationships, which is needed to manage process inputs in order to optimize for a specific output. DOE was used for X-4250 and X-4100, both dibenzoates, to help determine the optimal loading and processing conditions for use of dibenzoates in LVT applications. In some instances, values determined for X-4250 (a dibenzoate diblend) were deemed to be translatable to that which would be obtained for X-4020 (the dibenzoate triblend), so it was not separately tested.

The initial experiments focused on the North American market where the primary general-purpose plasticizer used is DOTP. LVT is the fastest growing sector of the US floor covering market, and this trend is expected to continue. This market currently exceeds $1 billion. The preliminary evaluation was to target this market by developing benchmark data on the use of dibenzoates as plasticizers for LVT formulations.

The goal of the initial experiments was to assess the amount of high solvating plasticizer that would be needed to achieve properties similar to those achieved with general-purpose plasticizers in vinyl flooring applications. Surprisingly, the results achieved with respect to hardness and rigidity (stiffness) were not what was known or expected for traditionally more efficient, high solvating plasticizers. It was expected that their use would result in a decrease in hardness; but, instead, hardness increased—a truly unexpected result that could not have been predicted based on current knowledge and experience in the field. The initial experiments showed that there were no conditions under which the dibenzoates alone demonstrated lower hardness than DOTP alone in a highly filled LVT formulation, a totally unexpected and surprising result.

The desirability of a harder versus softer tile remains unknown and likely varies according to producer. Some manufacturers believe a softer tile is more ideal, other manufacturers tout increased hardness as a feature in their advertising. It is accepted, however, that due to plasticizer use, LVT products may lack the hardness or rigidity sufficient to sustain durability over time.

Initial screens were run to determine formulation raw materials and processing conditions. Filler and heat stabilizer screens were performed first, in addition to industry research. (Results not shown.) Fillers evaluated included different particles sizes of ground calcium carbonate (GCC), a common filler in LVT applications. Typical heat stabilizers evaluated included solid and liquid Ca/Zn and Ba/Zn.

Once raw materials were determined based on these screens, DOE's were run for the dibenzoates to determine the most appropriate formulation materials and processing conditions. Additional testing was conducted to assess heat stability profiles, milling temperature, press temperature and time, and press pressure. (Results not shown.) From there, the formulations comprising dibenzoates alone were compared against 100% DOTP samples with an expanded set of testing to come up with optimized amounts and process conditions. Finally, the DOE's were expanded to include tests that demonstrated differences observed between formulations containing a dibenzoate as a modifier of DOTP and those containing 100% DOTP.

Table 1 below shows the formulation used for the unfilled wear layer, and Table 2 below shows the formulation used for the filled base layer. These generic formulations were used for all of the testing described herein, with variations in amounts of components as indicated in each example.

TABLE 1

Generic Wear Layer Formulation

| Component | Product | PHR |
|---|---|---|
| PVC | Formolon 622F | 100 |
| Plasticizer/Modifier** | 1. DOTP, | 28 |
|  | 2. X-4250 |  |
|  | 3. X-4100 |  |
| Heat Stabilizer | AM Stabilizers TS548 | 3 |

TABLE 2

Generic Base Layer Formulation

| Component | Product | PHR |
|---|---|---|
| PVC | Formolon 608 | 100 |
| Filler* | Titan 200 | 300 |
| Plasticizer/Modifier** | 1. DOTP, | 25 |
|  | 2. X-4250 |  |
|  | 3. X-4100 |  |
| Heat Stabilizer | AM Stabilizers TS549 | 3 |
| Dispersant | Disperplast 1142 | 3 |
| Lubricant | Stearic Acid | 2 |

*Amount of filler in the base layer varied for some experiments.
**Total plasticizer content is different for wear layer formulations vs. base layer formulations. Total plasticizer content includes traditional plasticizers alone or in combination with other plasticizer-modifiers. When describing modifiers as a % of total plasticizer content, the % is the same for both layers, although the phr may differ.

Example 1: Dibenzoate DOE's

In order to determine an appropriate loading % of dibenzoate plasticizers for use in LVT and the processing conditions with which the samples should be prepared, a DOE was run using Stat-Ease DesignExpert© version 10. The model was an optimal (custom) design using optimality-I. Table 3 shows the factors used and the ranges for testing in the DOE.

TABLE 3

Factors and Ranges Used for the DOE

| Factor | Range |
|---|---|
| Dibenzoates | 0-100% |
| Mill Temperature | 165-195° C. |
| Press Temperature | 50-190° C. |
| Press Pressure | 5-50 tons |

The first response that was observed was the fuse time for both the base and wear layers. As expected, as both temperature and dibenzoate percentage (amount) was increased, the fuse time decreased. This relationship was stronger in the wear layer than in the base layer. This is a property that is expected to be achieved with the use of high solvating plasticizers, such as the dibenzoate modifiers of the invention.

The hardness of the samples was measured and, as anticipated based on unexpected results observed above, was found to be directly related to the amount of dibenzoate utilized (%). This relationship was more pronounced with X-4100 than it was with X-4250. FIG. 1 shows the wear layer hardness achieved at 10 seconds for both X-4250 and X-4100, in which dibenzoate amount (in percentage, %) and mill temperature was modeled. In the models, X-4250 increased hardness by about 6 units, and X-4100 increased the hardness by about 10 units.

Figure 2:
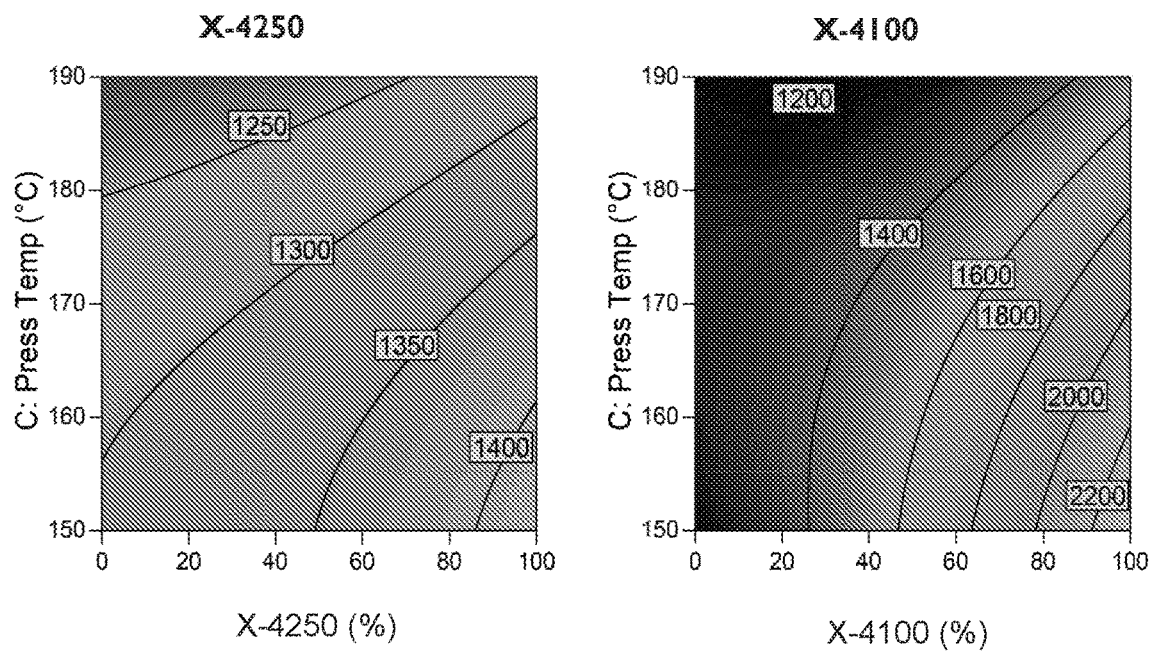
FIG. 2 shows modeling of wear layer tensile strength in a composite tile for various % of dibenzoate modifiers and using various press temperatures.

The next response measured was tensile strength. As dibenzoate amounts (X-4250 and X-4100) were increased and the press temperature and pressure were decreased, the tensile strength increased. Similar to the hardness, the relationship was more pronounced when X-4100 was used as compared to X-4250. FIG. 2 shows the tensile strength models for both products, in which dibenzoate amounts (%) and press temperature were modeled.

Based on the recommended models and selecting certain criteria for each response/property described above, dibenzoate loading and processing conditions were determined. Table 4 shows the modifier loading and processing conditions for the samples that were selected based on properties desired. The use of dibenzoates had already demonstrated advantages as compared to using DOTP alone. In the case of X-4250, it was determined that mill temperature could be decreased by 10° C. and the press pressure by 30 tons, when compared to that required for 100% DOTP to obtain optimal final properties. With X-4100, it was determined that the mill temperature could be decreased by 5° C. and the press pressure by 23 tons. In both instances, significant savings in the cost of manufacturing could be realized, saving the manufacturer time and money, without needing to offset the entire plasticizer package.

TABLE 4

Dibenzoate Loading and Processing Conditions

| | Plasticizer (%, of total plasticizer) | | | | Processing Conditions | | |
|---|---|---|---|---|---|---|---|
| Sample ID | DOTP | X-4020 | X-4250 | X-4100 | Mill Temp. (° C.) | Press Temp. (° C.) | Pressure (tons) |
| DOTP | 100 | 80 | 80 | 91 | 195 | 175 | 50 |
| 20% X-4020 | — | 20 | — | — | 185 | 175 | 20 |
| 20% X-4250 | — | — | 20 | — | 185 | 175 | 20 |
| 9% X-4100 | — | — | — | 9 | 195 | 170 | 27 |

Example 2: In-Depth Testing—Dibenzoate Modifiers Vs. DOTP Alone

To see how the conditions in Table 4 varied from each other, samples were tested more in depth than the initial DOE examples above. For this example, three dibenzoates, X-4100, X-4250 and X-4020 were evaluated as modifiers for DOTP and compared to the use of DOTP alone. Amounts of X-4250 and X-4020 used were 20% of the total plasticizer load (balance 80% DOTP), and X-4100 was used at 9% of the plasticizer load (balance 91% DOTP).

Figure 3:
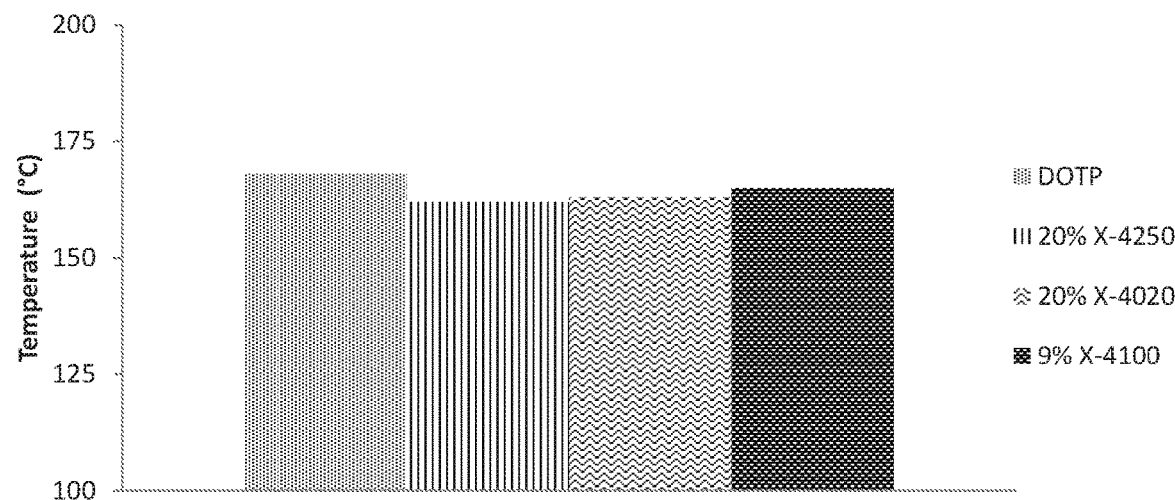
FIG. 3 shows fusion temperatures (° C.) of base layer samples comprising DOTP alone and as modified with various % of dibenzoate modifiers.

The first observation was the fusion temperature, which was performed only on base layers. FIG. 3 shows the fusion temperature of the base layer samples. The use of all dibenzoate modifiers provided a decrease in fusion temperature, even considering that the amount of plasticizer was relatively small compared to the rest of the formulation.

Figure 4:
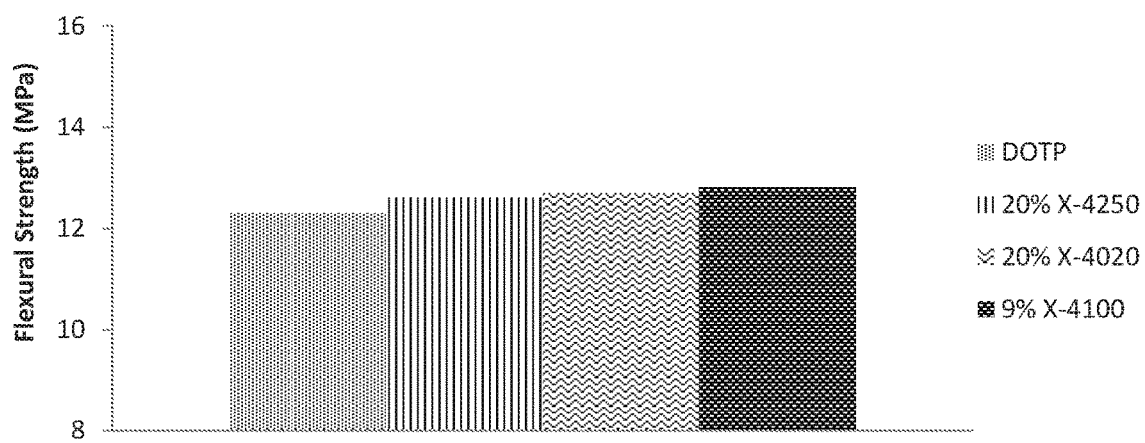
FIG. 4 shows the flexural strength (MPa) of composite samples comprising DOTP alone and as modified with varying % of dibenzoate modifiers.

LVTs are installed by snapping two tiles together. In order to see which tile had a greater strength and could bend more before breaking, the flexural properties were measured. The flexural modulus, which is an indication of stiffness, was observed to increase with all of the dibenzoate modifiers. FIG. 4 shows the flexural strength of samples using the loading and processing conditions of Table 4. Again, like the flexural modulus, the strength was observed to have increased with use of all of the dibenzoates tested.

Figure 5:
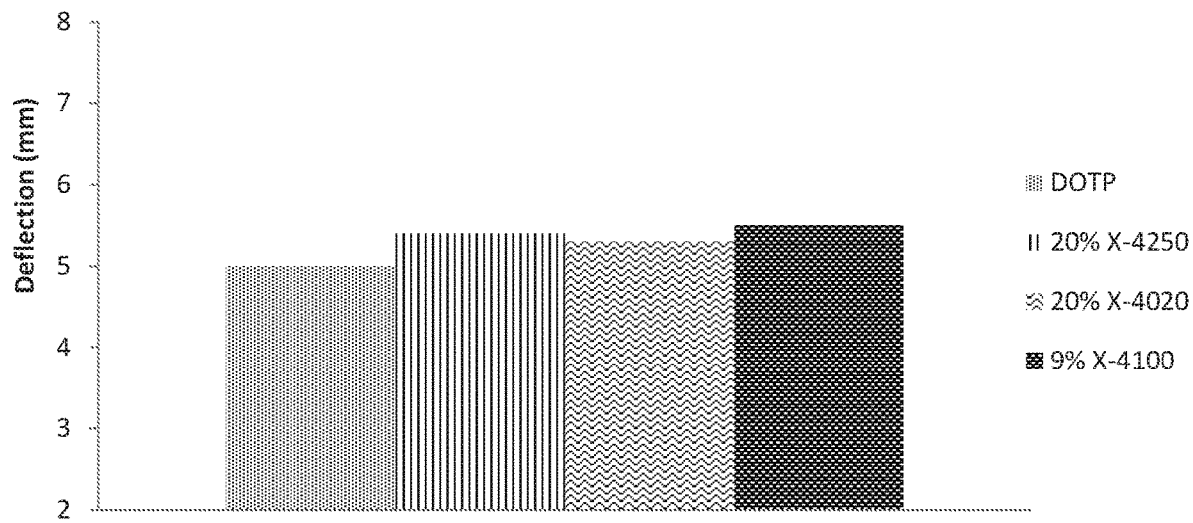
FIG. 5 shows deflection (mm) results for composite samples comprising DOTP alone and as modified with varying % of dibenzoate modifiers.

FIG. 5 shows deflection of the samples, i.e., how much the sample bent before breaking. Dibenzoate—modified tiles appeared to provide a slight increase in deflection, indicating greater flexibility and ease of installation, but this might have been within the noise of the test.

To simulate the resistance of the tiles to deformity after being walked on by high-heeled shoes or holding up the weight of furniture, the indentation resistance was measured. It was found that using of all of the dibenzoate modifiers provided increased resistance to indentation. FIG. 6 shows the indentation resistance of the samples.

Figure 7:
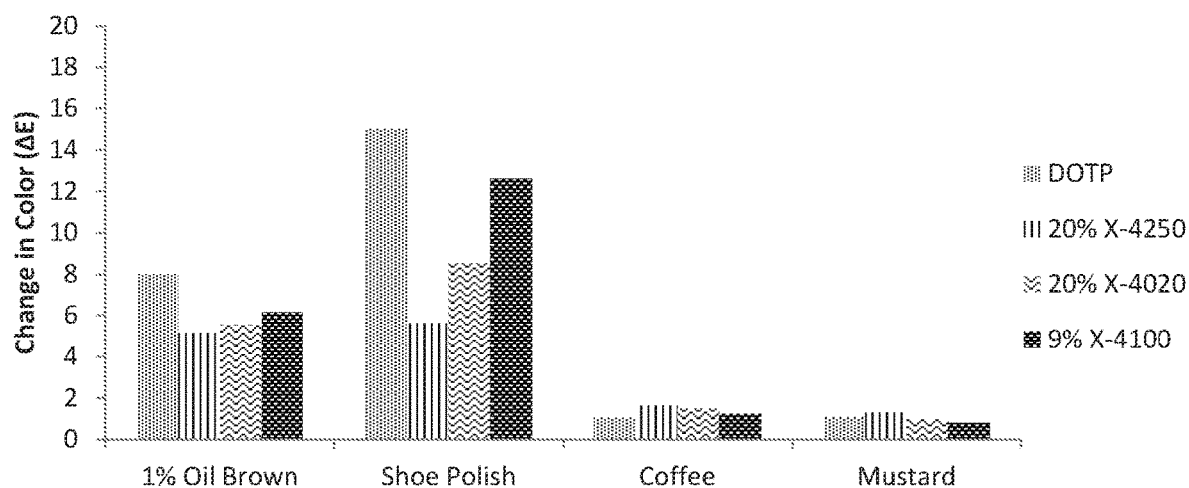
FIG. 7 shows stain resistance results (color change ΔE) for composite samples comprising DOTP alone and as modified with varying % of dibenzoate modifiers, measured for 1% Oil Brown, Shoe Polish, Coffee and Mustard.

Stain resistance was also tested and is shown in FIG. 7. As expected, based on historical performance, the addition of dibenzoate modifiers provided an increase in resisting oil brown and shoe polish, but the differences in resistance to waterborne stains (coffee and mustard) were negligible.

Curling and water absorption were also measured (results not shown), and dibenzoate modifiers appeared to provide some improved resistance to both curling and absorbing water, but those differences might have been within the error of the test.

Figure 8:
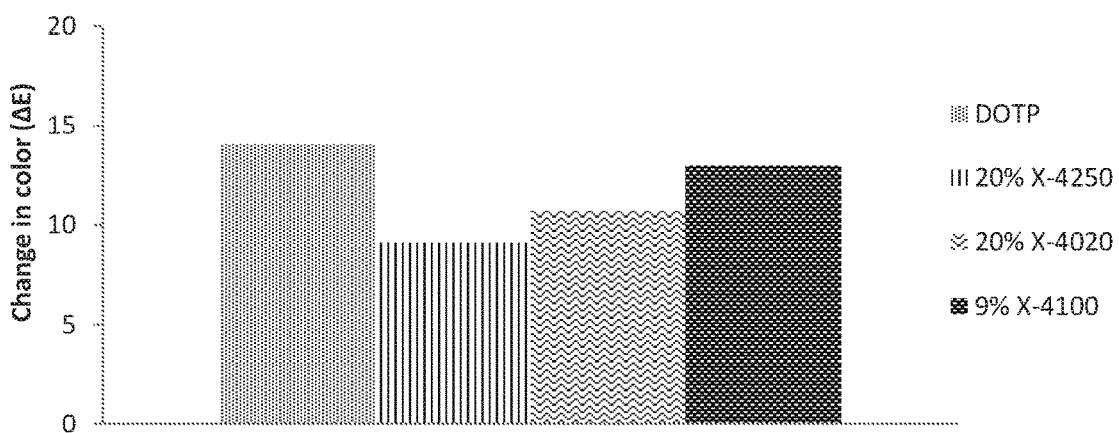
FIG. 8 shows heat resistance results (color change ΔE) for composite samples comprising DOTP alone and as modified with varying % of dibenzoate modifiers.

The final test was heat resistance, as shown in FIG. 8. All dibenzoate modified samples provided an increase in heat resistance, likely because of the reduced heat history due to the lower temperatures required to process the tiles containing the modifiers.

In addition to the testing above, the following tests were run on the samples, but resulted in negligible differences: torque at fusion, process volatility, Shore D hardness, abrasion resistance, dimensional stability, vertical rebound, gloss, chemical resistance, and plasticizer compatibility.

Example 3: Expanded DOE

Figure 9:
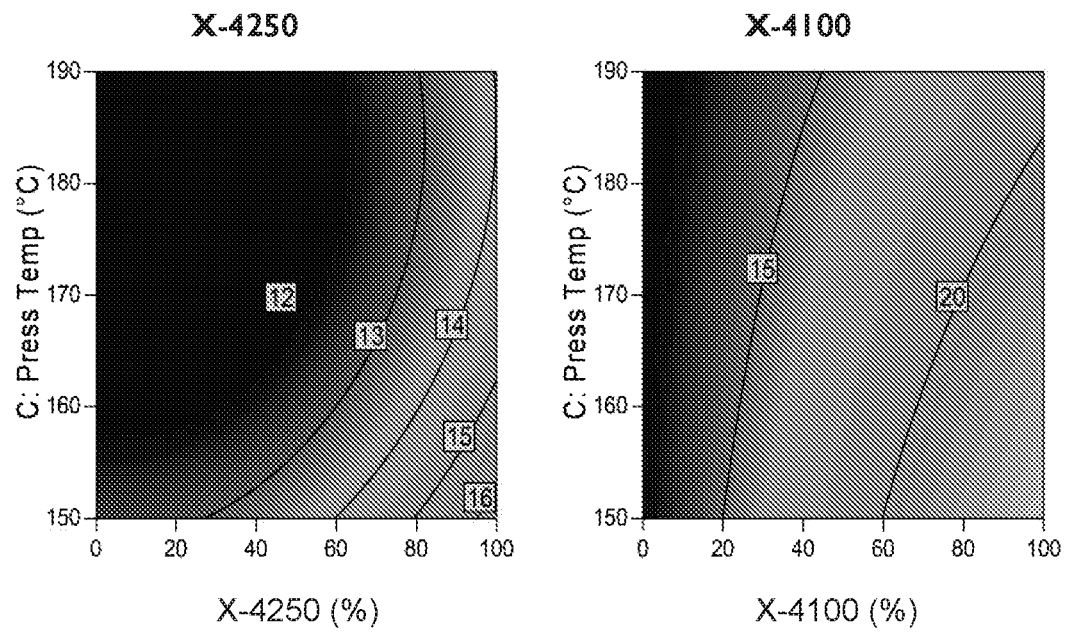
FIG. 9 shows modeling of flexural strength of wear layers of a composite tile using dibenzoate modifiers at various % and various press temperatures.

Based on the results found in the extensive, in-depth testing of the dibenzoate-modified samples as compared to DOTP alone using the loading and process conditions of Table 4, Example 2, the following tests were added to the original DOE samples: indentation resistance, flexural modulus, flexural strength, deflection, curling and water absorption. As expected, based on the results above, all the flexural parameters were impacted by dibenzoate concentration, but they were also impacted by the press temperature and press pressure. FIG. 9 shows the flexural strength models for both X-4250 and X-4100 samples, in which dibenzoate amounts (%) and press temperature were modeled.

Both curling and water absorption testing showed no impact or very little impact (results not shown) by changing any of the factors used in the DOE (see Table 3).

The indentation resistance is related to all of the parameters of Table 3 and was increased by increasing dibenzoate amount (%), mill temperature and press pressure and by decreasing press temperature. FIG. 10 shows the indentation resistance of both dibenzoates tested, in which both mill and press temperatures are modeled.

Again, based on the recommended models and selecting certain criteria for each response/property desired, appropriate dibenzoate loading and processing conditions were determined. Table 5 shows the formulations proposed by the software. As seen in Table 5, the use of dibenzoate modifiers had even more of an advantage as compared to just using DOTP alone than was originally anticipated. In the case of X-4250, it was determined that mill temperature could be decreased by 25° C., and the press temperature by 10° C. With X-4100, it was determined that the mill temperature could be decreased by 30° C., and the press temperature by 20° C. In both instances, savings in the cost of manufacturing can be realized, which could save a manufacturer time and money.

TABLE 5

Dibenzoate Loading and Processing Conditions

| Factor | DOTP | X-4250 and X-4020 | X-4100 |
|---|---|---|---|
| Dibenzoate (%) added (based on total plasticizer content) | 0 | 80 | 75 |
| Mill Temperature (° C.) | 195 | 170 | 165 |
| Press Temperature (° C.) | 170 | 160 | 150 |
| Press Pressure (tons) | 26 | 50 | 50 |

The original goal was to prepare an LVT product using dibenzoate plasticizers as a substitute for traditional general-purpose plasticizers used in LVT, intending at first to capitalize on the dibenzoates' greater softening efficiency so that less plasticizer could be used overall. However, it was discovered that despite trying different formulations and processing approaches; instead of reducing hardness, the dibenzoates surprisingly resulted in a harder, more rigid tile. This result was quite unexpected from the use of components traditionally known to be efficient, high solvating plasticizers with softening effects.

As expected, use of high-solvating dibenzoate modifiers provided decreases in fusion temperature, processing time and processing temperature, a typical result for highly efficient, high solvating plasticizers. Dibenzoate modifiers also provided improved heat and stain resistance. The most surprising and totally unexpected effect from dibenzoate modifier use was increased flexural strength, hardness, indentation resistance and deflection, hence improved durability, not heretofore known, recognized or expected from their use.

Extensive testing validated that both X-4250 and X-4100 modifiers performed comparably to each other and showed an advantage for the use of dibenzoates in LVT applications. Overall, testing demonstrated that X-4250 can be recommended to be used at levels up to 80% of the total plasticizer concentration (loading), whereas X-4100 can be recommended up to 75% of the total plasticizer concentration, with the recommended processing temperatures being lower than that for X-4250. Both X-4250 and X-4100 are recommended to be processed at significantly lower temperatures than 100% DOTP. For X-4020, it is anticipated that results would be very similar, and X-4250 may be used as a reference for expected performance of X-4020.

LVT that is prepared with dibenzoate modifiers provides several manufacturing and end-product benefits that may be found to be valuable by LVT producers, including unexpected performance outside of what is typically expected for high-solvating plasticizers (i.e., a reduction in energy to produce). Dibenzoate blends appear to be viable options for the production of LVT and may be particularly useful when a harder, more durable LVT product is desired. Indeed, a primary advantage was the unexpected discovery that use of dibenzoate modifiers can result in increased hardness and rigidity (stiffness) of the final product, resulting in improved and sustained durability. Another advantage may be improved coefficient of friction and sound dampening over that achieved with the use of traditional general-purpose plasticizers in these applications. Given that a major disadvantage of current LVT is softness or less rigidity, and that many consumers now prefer a harder or more rigid product, the use of dibenzoates provide a significant advantage over use of traditional general-purpose plasticizers used alone in LVT applications.

From the initial experiments described above comparing dibenzoate plasticizers alone vs. DOTP alone, and evaluating dibenzoates as modifiers for DOTP, more in depth experimentation was undertaken. Additional work was done using the basic formulations for wear and base layers set forth in Tables 1 and 2, with some variations in types and amounts of components used as indicated.

Example 4—Modifier in Various Layers with 200 PHR/300 PHR Filler Base

Various samples having wear and base layers (composites) were prepared comparing use of DOTP alone in the wear (W) and base (B) layer (200 phr filler) vs. use of the dibenzoate X-4100 as a modifier added at 40% of the total plasticizer load (balance (60%) DOTP).

FIG. 11 shows Shore D hardness and indentation results (mils) obtained for various layers, having DOTP alone, 40% X-4100 in the wear and base layers, 40% X-4100 in the wear layer and DOTP in the base layer, and DOTP in the wear layer and 40% X-4100 in the base layer. The results demonstrated that the addition of X-4100 dibenzoate modifier in any layer improved the two properties. Hardness was improved with the modifier in any layer, but indentation was significantly improved with the modifier in both layers.

Figure 12:
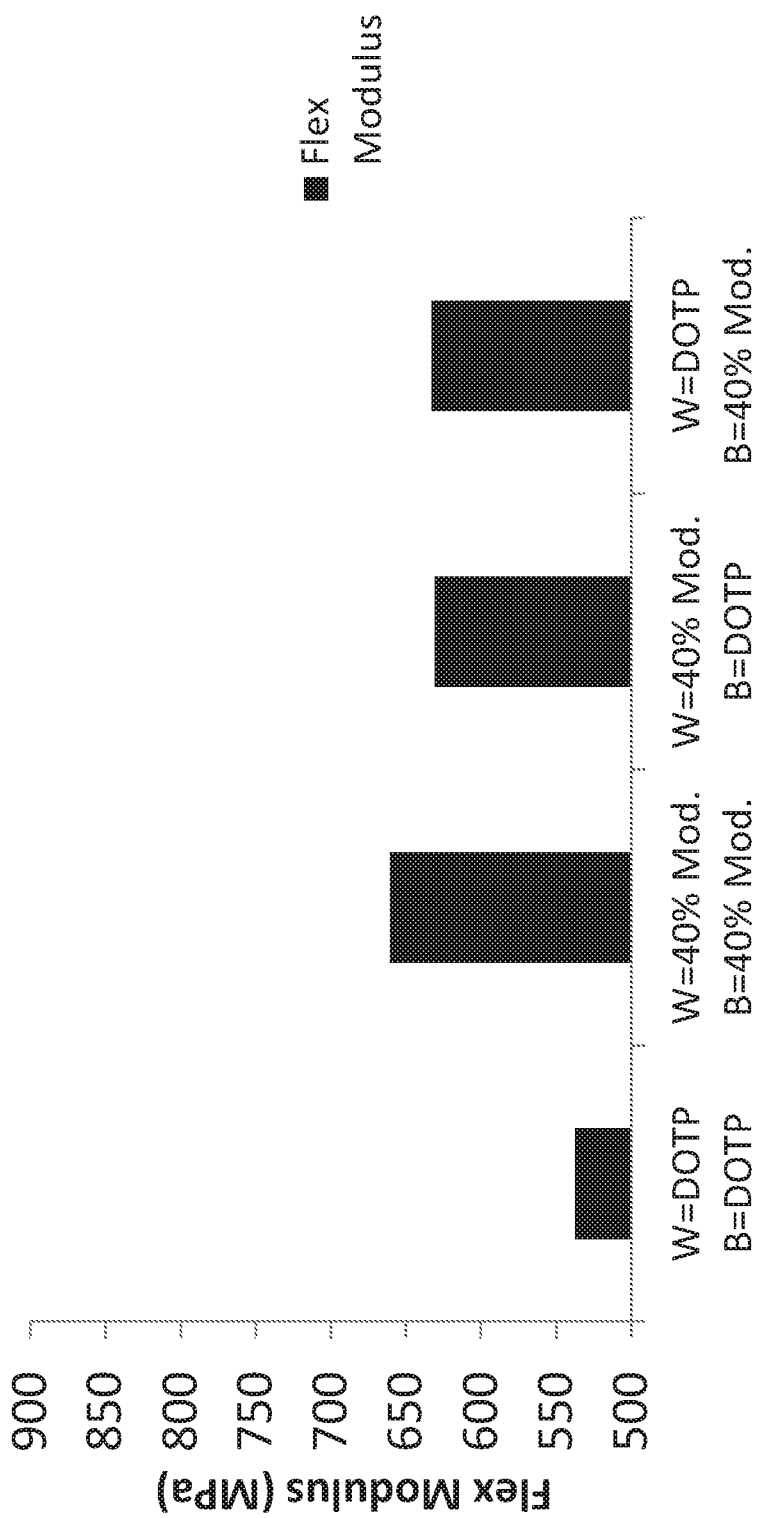
FIG. 12 shows flexural modulus (MPa) values for samples having a wear layer and a 200 phr base layer using DOTP alone in both layers and combinations of modifier in either or both of the wear and base layer.

FIG. 12 shows flexural modulus results obtained for the same wear/base layer samples as described above for FIG. 11. The addition of the X-4100 modifier in any layer improved the flexural modulus, but the flexural modulus was significantly improved with the modifier in both layers.

Figure 13:
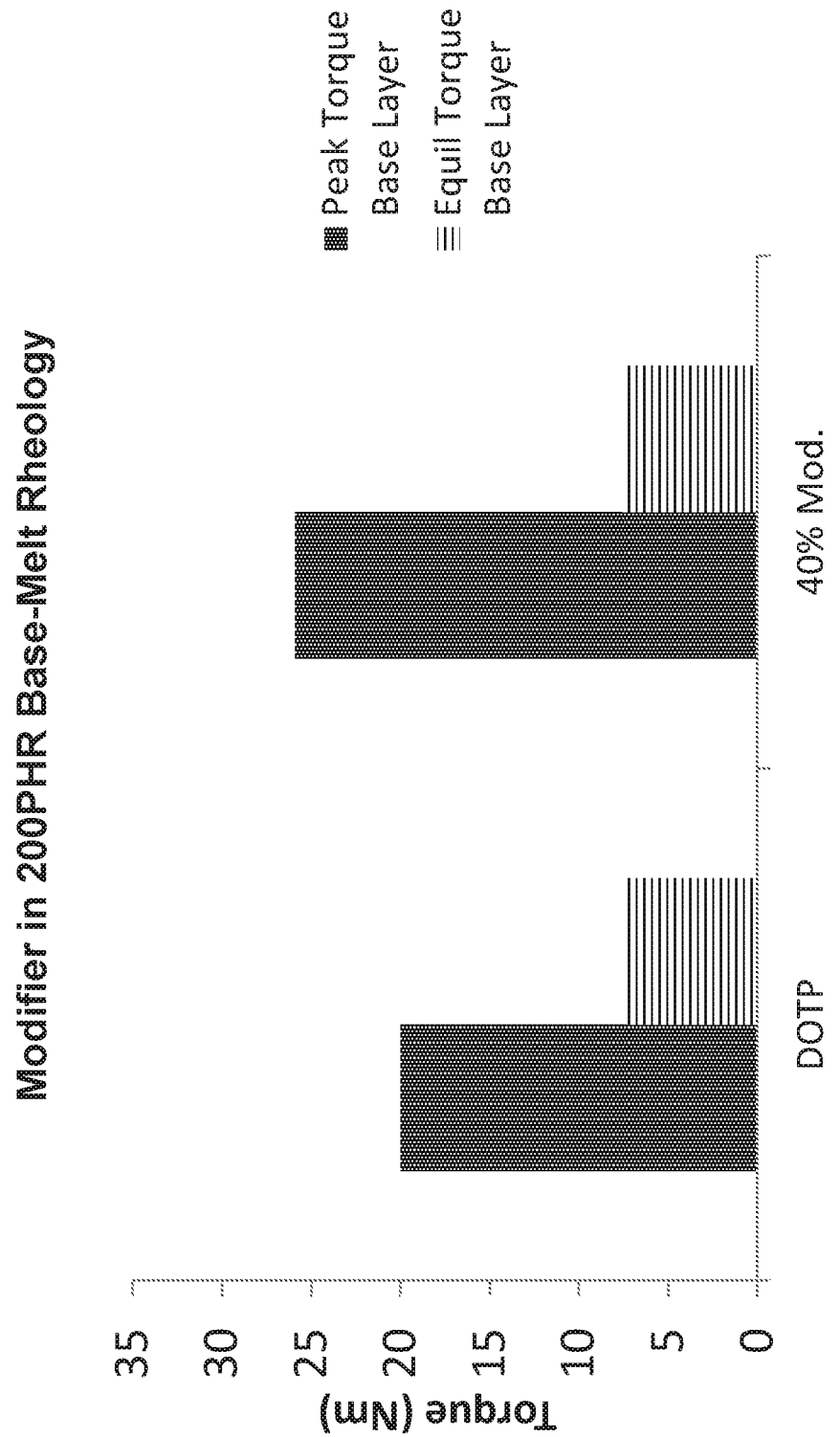
FIG. 13 shows melt rheology (peak and equilibrium torque (Nm)) values in a sample having a 200 phr base layer using DOTP alone and as modified with 40% dibenzoate (balance 60% DOTP).

FIG. 13 shows melt rheology results (torque (Nm) at peak and equilibrium) obtained for samples having a 200 phr base layer and comparing DOTP alone vs. 40% X-4100 modifier (with the balance (60%) DOTP). The addition of modifier increased the torque. Impact was larger in the peak torque as compared to the equilibrium torque, which may be a consideration during manufacturing.

Tests were then conducted comparing samples having a 200 phr vs. 300 phr filled base, comparing DOTP alone with X-4100 modifier at 40% (balance (60%) DOTP).

Hardness/indentation was determined for samples having a 200 phr vs. 300 phr base layer. The results in FIG. 14 show that the addition of X-4100 modifier improved hardness and indentation in both 200 phr and 300 phr base systems. The increase in hardness was larger in the 300 phr system, but the indentation was larger in the 200 phr system.

Figure 15:
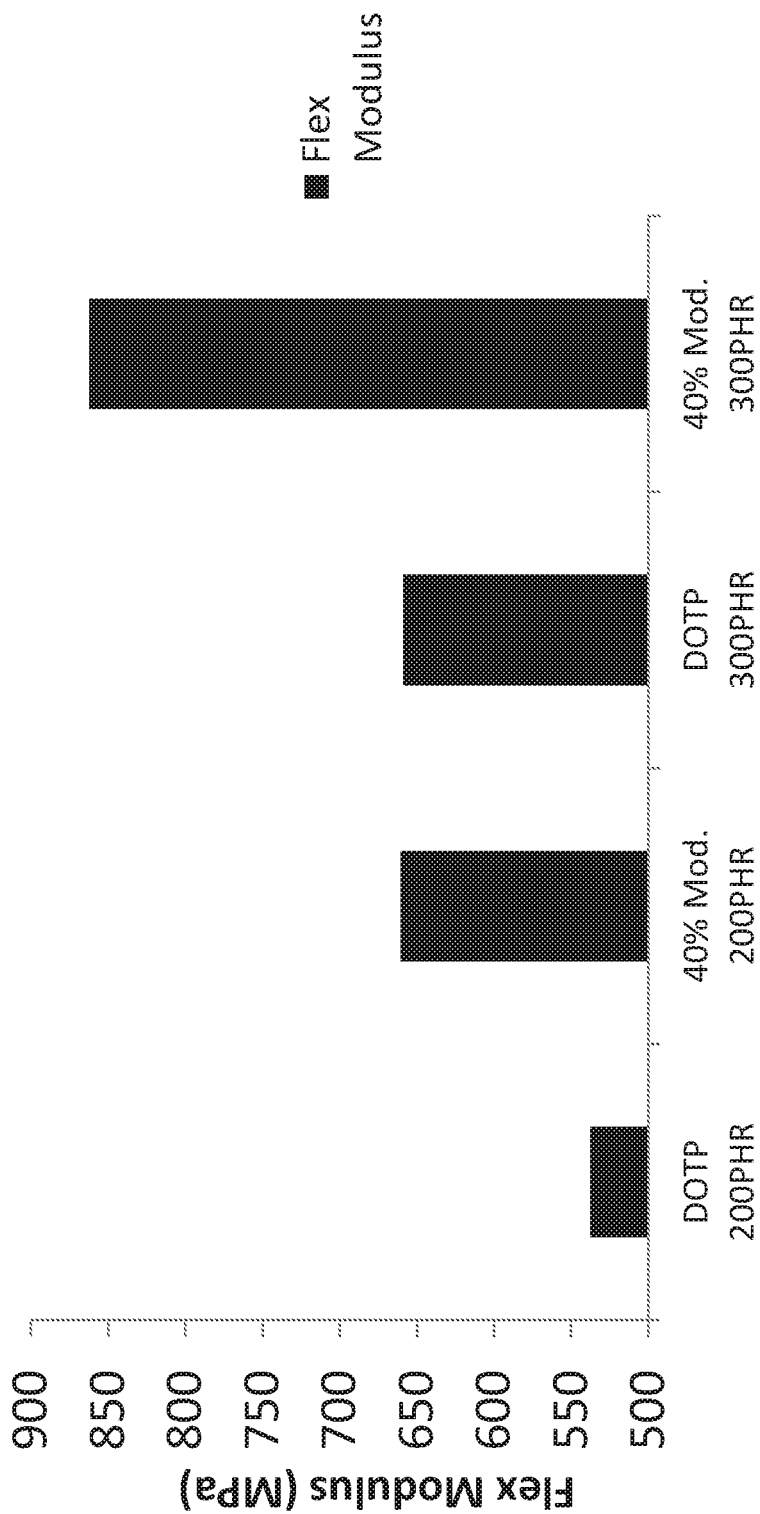
FIG. 15 shows flexural modulus (MPa) values obtained for samples having 200 phr or 300 phr base layers, comparing DOTP alone and as modified with 40% dibenzoate.

Flexural modulus (MPa) was also determined for samples having a 200 phr vs. 300 phr base layer. The results in FIG. 15 show that the addition of X-4100 modifier improved the flexural modulus in both 200 phr and 300 phr base systems. The percentage increase was larger in the 300 phr system.

Figure 16:
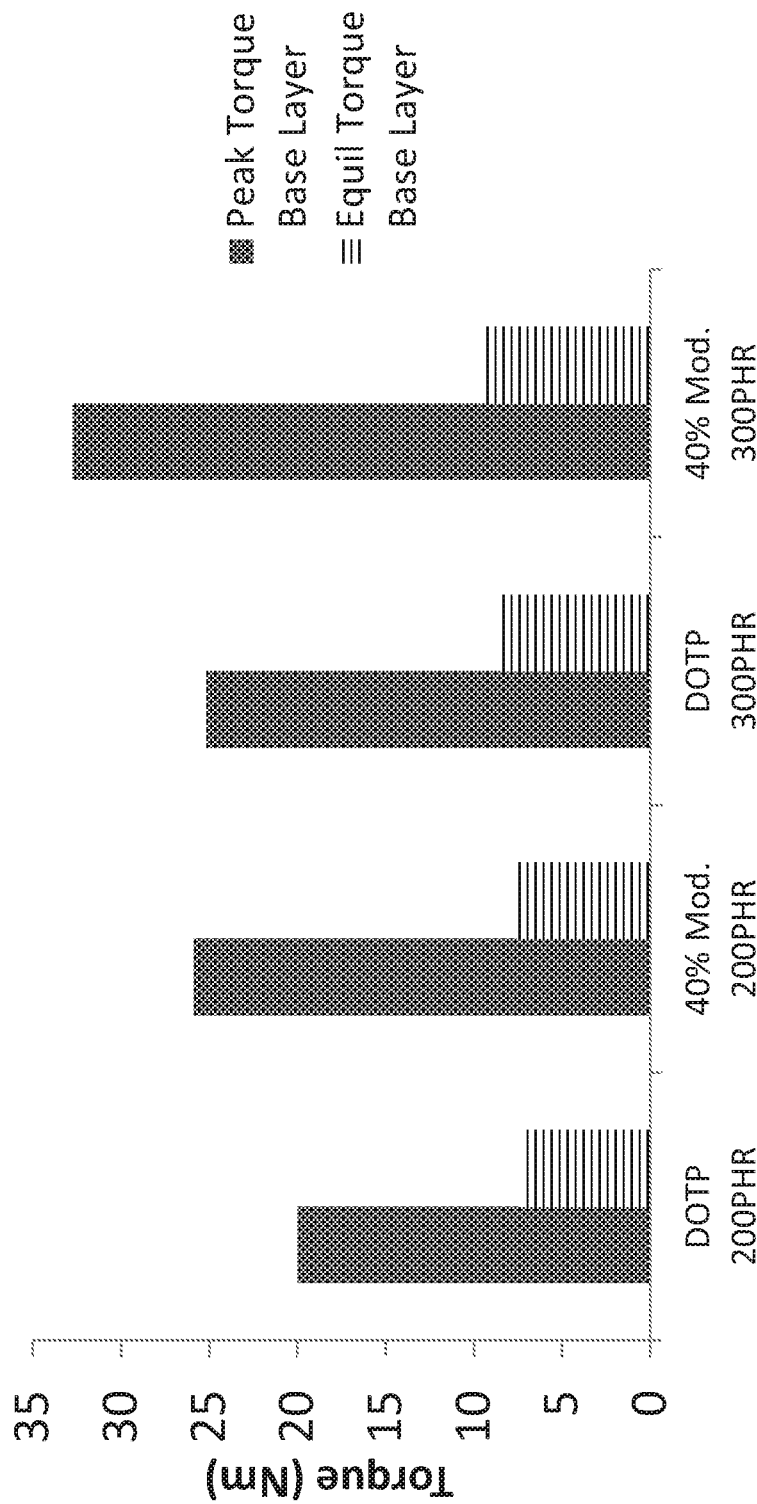
FIG. 16 shows melt rheology (peak and equilibrium torque (Nm)) values obtained for samples having 200 phr or 300 phr base layers, comparing DOTP alone and as modified with 40% dibenzoate.

Melt rheology (torque (Nm) at peak and equilibrium) was also determined for the samples having a 200 phr vs. 300 phr base layer. The results in FIG. 16 show that the percentage increase for peak torque is equivalent in both systems, but the increase is slightly more in the 300 phr system for the equilibrium torque. While lower torque is preferred in manufacturing, a small increase may be tolerated and acceptable in view of other benefits.

Example 5—Plasticizer Loss

Process volatility and hardness (Shore D) was evaluated for milled wear (W) layer samples comprising 0% (DOTP alone) and 40% X-4100 modifier, 40% DBT (a high solvating plasticizer) and 40% P1400 (another high solvating plasticizer), as compared to a base layer (B) comprising 200 phr filler and 40% X-4100 modifier. For all 40% modifier samples, the balance was 60% DOTP. Volatility was assessed by % of total plasticizer lost from the samples.

Figure 17:
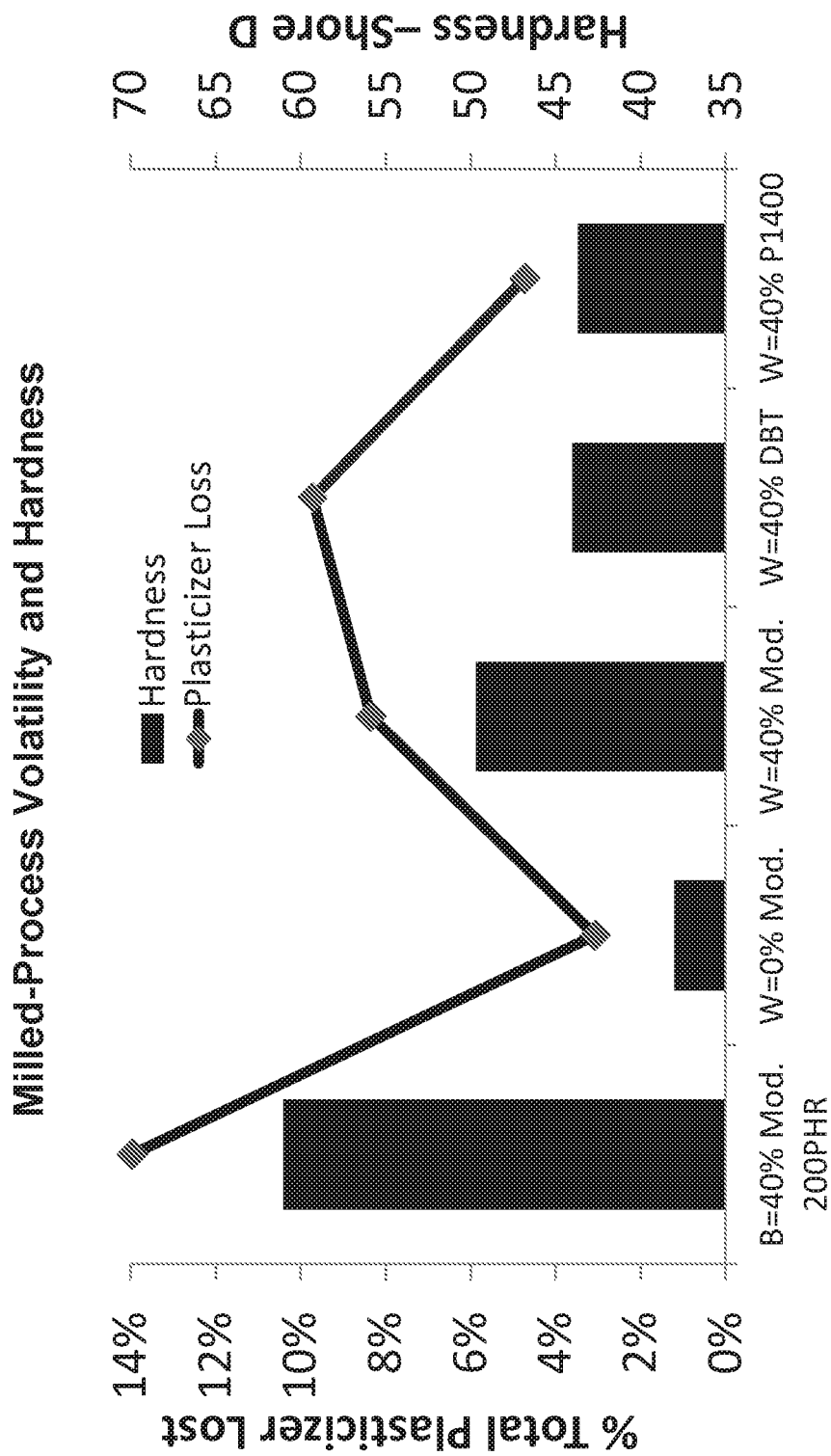
FIG. 17 shows volatility (% Total Plasticizer Lost) and hardness (Shore D) results obtained for various milled process base and wear layer samples.

FIG. 17 shows volatility (% Total Plasticizer Lost) and hardness (Shore D) results obtained for the milled samples. Larger plasticizer loss was observed in the base layer having 40% modifier as compared to the wear layers having DOTP alone, 40% modifier, 40% DBT and 40% P-1400. As indicated by the corresponding hardness values, plasticizer loss is not the primary reason for improved hardness, as the DBT sample had the greatest plasticizer loss from the wear layers but was only moderately harder than the DOTP control (0% modifier), and softer than the dibenzoate sample.

Figure 18:
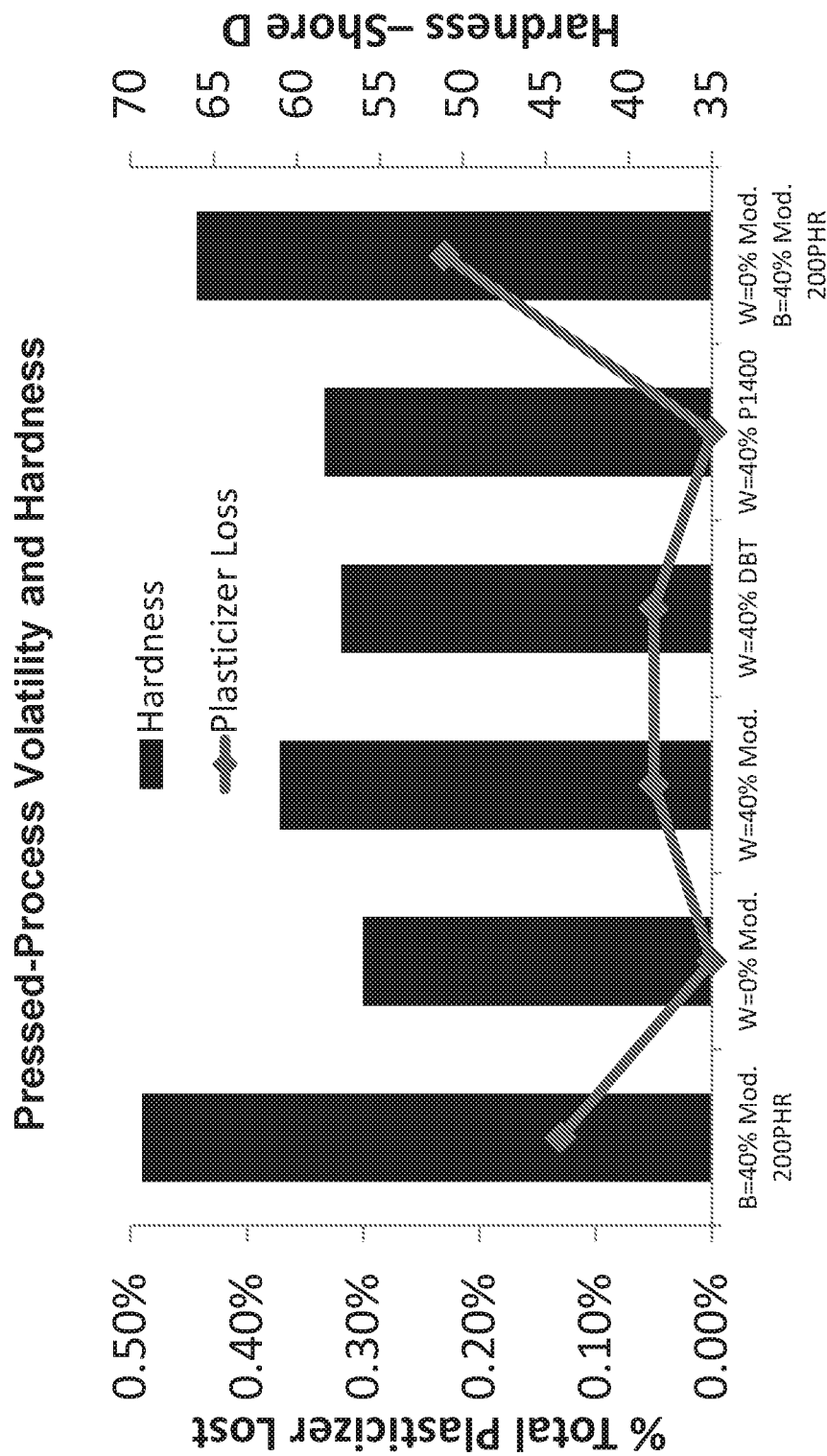
FIG. 18 shows volatility (% Total Plasticizer Lost) and hardness (Shore D) results obtained for various pressed process base and wear layer samples.

FIG. 18 shows volatility and hardness results for pressed base and wear layer samples (as described above and in FIG. 17) and a composite pressed sample comprising 0% modifier (DOTP alone) in the wear layer and 40% X-4100 modifier in a 200 phr filler base layer. The results show that the % plasticizer loss was negligible for pressed samples as compared to the amount of plasticizer lost during milling. The dibenzoate modifier maintained increased hardness throughout processing.

Example 6—Modifier Vs. Competitive Fast Fuser Evaluations

Samples having 200 phr filler in the base layer were prepared, comprising DOTP alone, 40% X-4100 modifier, 40% DBT, and 40% P1400, with the balance (60%) being DOTP in the 40% samples.

FIG. 19 shows hardness (Shore D) (10 second) and indentation results (mils) (10 minute) obtained for the samples. The results demonstrated that the dibenzoate X-4100 modifier achieved improved properties as compared to the other fast fuser plasticizers DBT and P1400, although all modified samples had improvement over DOTP alone.

Figure 20:
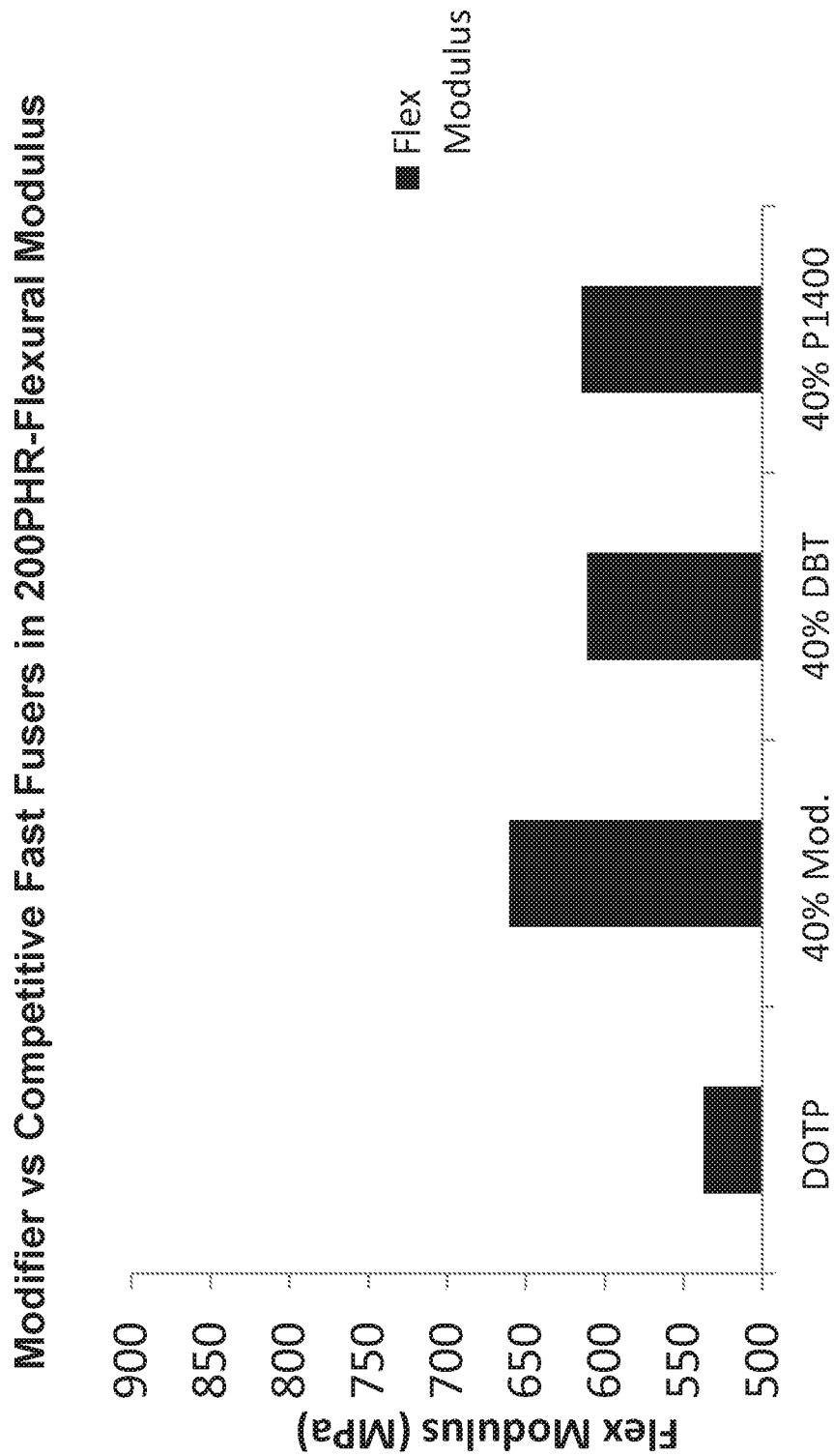
FIG. 20 shows flexural modulus (MPa) values for various samples having a 200 phr base layer, comparing DOTP alone and as modified with 40% fast fusers including dibenzoate, DBT and P1400.

Similarly, FIG. 20 shows flexural modulus (MPa) results obtained for the same samples, which also showed that the use of the X-4100 modifier improved flexural modulus as compared to the other fast fuser plasticizers (DBT and P1400), although all modified samples had improvement over DOTP alone.

Figure 21:
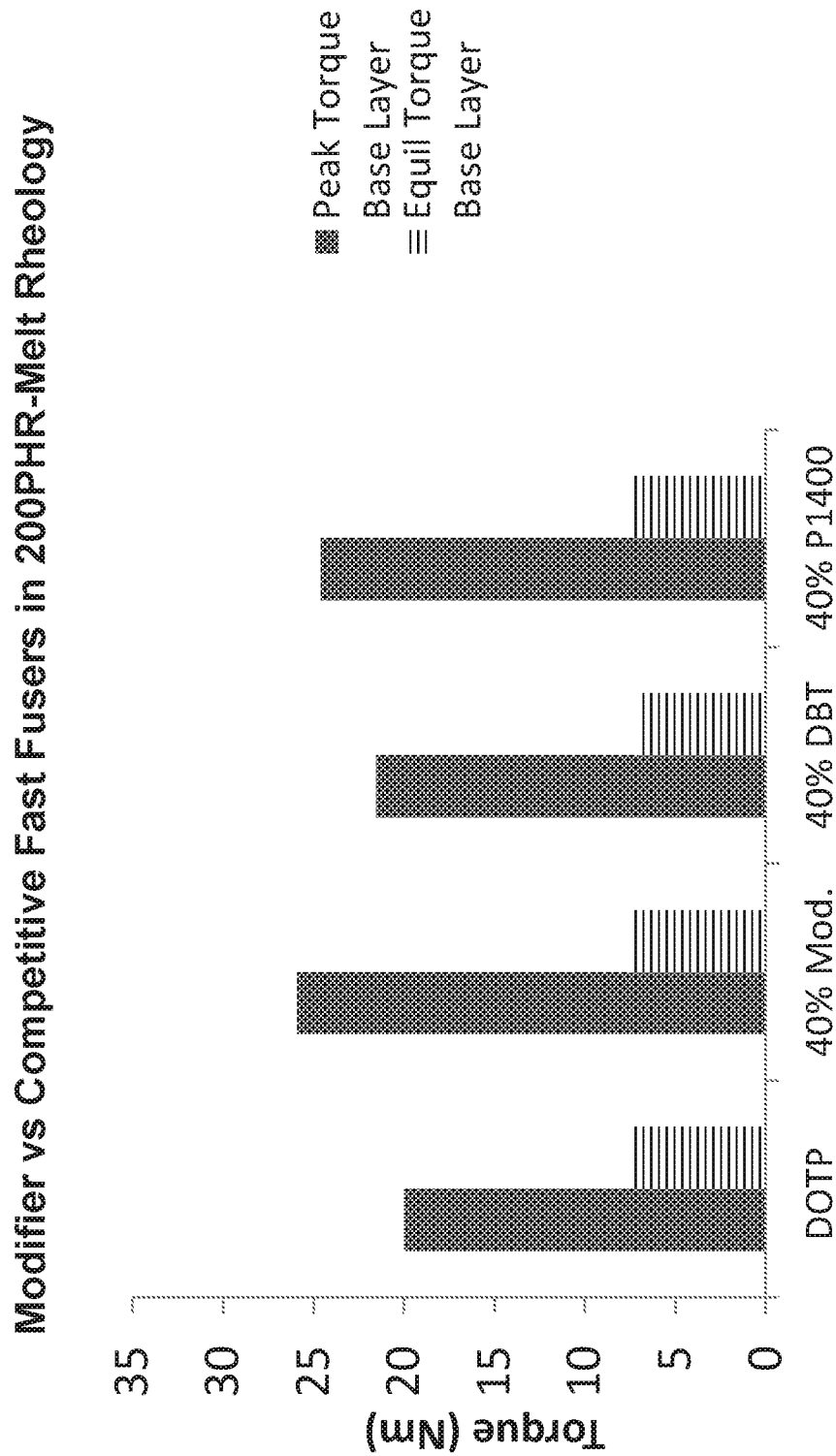
FIG. 21 shows melt rheology (peak and equilibrium torque (Nm)) for various samples having a 200 phr base layer, comparing DOTP alone and as modified with 40% fast fusers including a dibenzoate, DBT and P1400.

FIG. 21 shows melt rheology results (torque (Nm) at peak and equilibrium) for the samples. The results showed that the peak torque values were the largest with the addition of any modifier, with similar values for equilibrium torque for all samples.

Example 7—Hardness Achieved at Specific Process Conditions

Base layer and composite (having both wear and base layers) samples were prepared and evaluated at process conditions comprising: mill temperature 180° C., press temperature 160° C. and press pressure 50 tons. Samples included: no modifier/wear layer (composite tile with no modifier), 40% X-4100 modifier/wear layer (a composite tile with 40% modifier), no modifier/no wear layer (base layer only with no modifier), 40% X-4100 modifier/no wear layer) (base layer only with 40% modifier).

Figure 22:
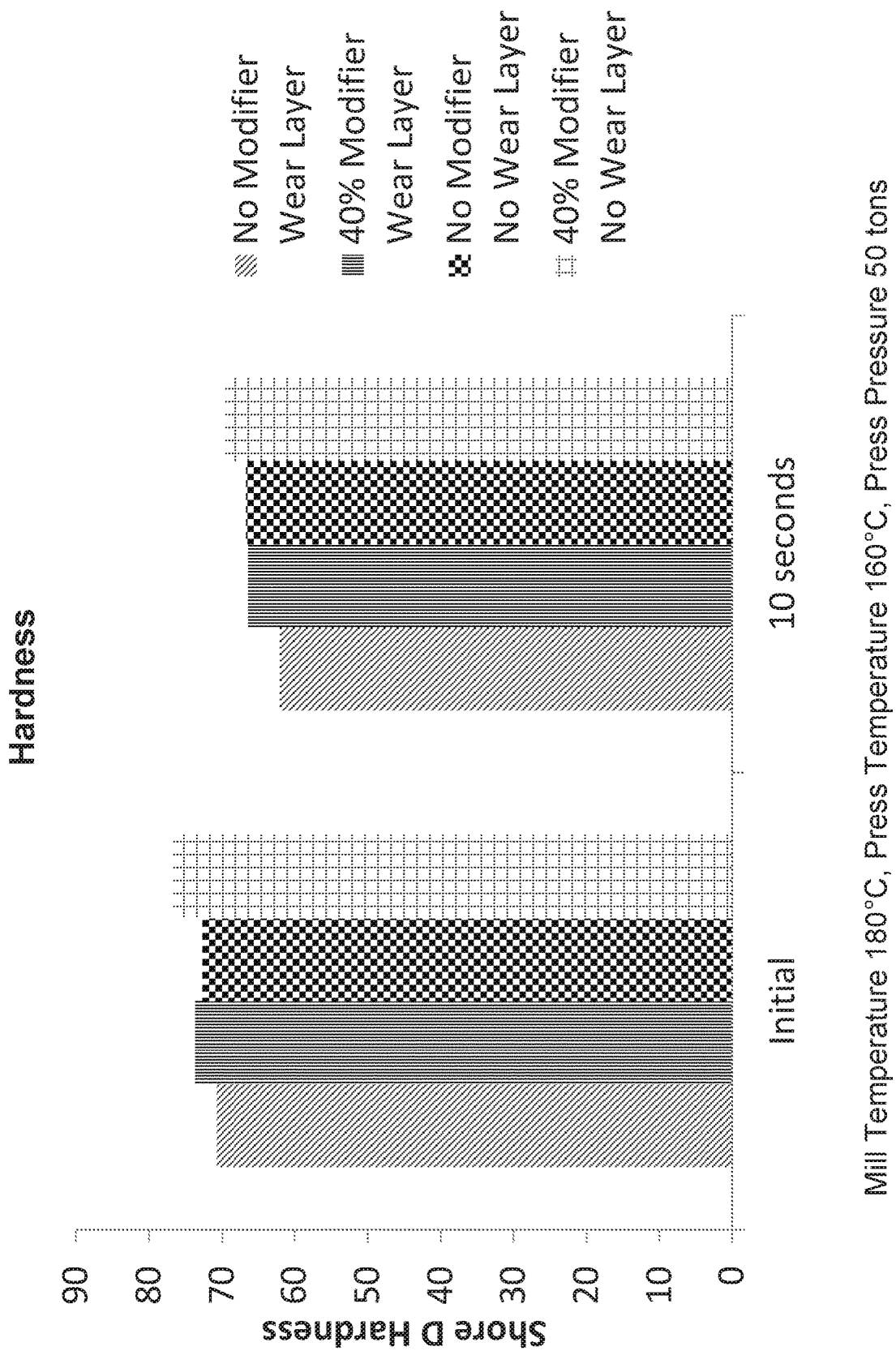
FIG. 22 shows Shore D hardness values for base layer only and composite (having both wear and base layers) samples evaluated at specific process conditions, with and without modifier.

Results obtained for initial and ten second hardness are shown in FIG. 22. The results show that addition of modifier improved hardness.

Indentation results are shown in FIG. 23 for the same samples and same process conditions and using various weights and times. At 150 lb. weight, modified samples showed improved indentation.

Figure 24:
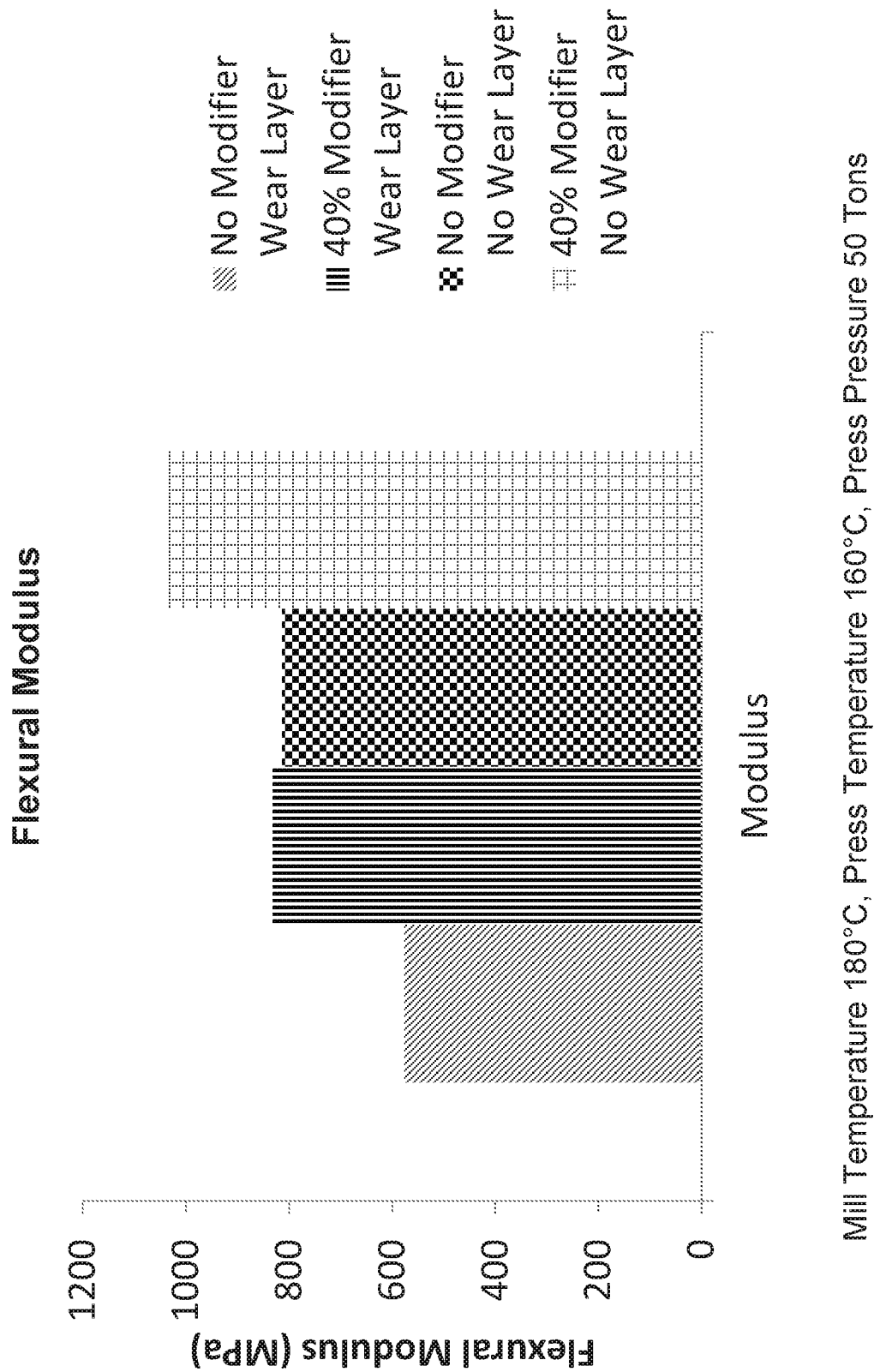
FIG. 24 shows flexural modulus (MPa) values for base layer only and composite samples evaluated at specific process conditions, with and without modifier.

Flexural modulus (MPa) results are shown in FIG. 24 for the same samples and process conditions. The results showed that modified samples had improved flexural modulus over unmodified samples.

The results above demonstrated again that use of high solvating/fast fusing dibenzoate modifiers can provide a harder, stronger construct when compared with the use of DOTP alone or other high solvating/fast fusing non-benzoate plasticizers. Other high solvating/fast fusing plasticizers can be used as modifiers to produce harder constructs, but to a lesser degree than the dibenzoates. This too was surprising since high solvating, fast fusing plasticizers are generally known and understood to be more efficient in softening vs. DOTP, and not hardening.

The results demonstrate that increased hardness cannot be solely due to volatile loss of plasticizers, as the plasticizers having the most volatile loss did not result in the hardest tiles.

In some instances, results demonstrated that filler load may have an effect on melt rheology torque, which may be a consideration in manufacturing.

While in accordance with the patent statutes, the best mode and preferred embodiment have been set forth, the scope of the invention is not limited thereto, but rather by the scope of the attached claims.

What is claimed is:

1. A luxury vinyl tile formulation comprising:
polyvinyl chloride homopolymers or copolymers;
a modifier plasticizer, wherein the modifier plasticizer is 1,2-propylene glycol dibenzoate;
a traditional plasticizer, wherein the traditional plasticizer is selected from dioctyl terephthalate, diisononyl phthalate, and diisononyl cyclohexane-1,2-dicarboxylate; and
optionally, a filler.

2. A vinyl floor covering comprising the luxury vinyl tile formulation of claim 1, wherein the formulation is used in a wear layer or base layer of the vinyl floor covering or both.

3. The luxury vinyl tile formulation of claim 1,
wherein the filler is present at 200 phr or 300 phr, based on 100 parts of the PVC homopolymer or copolymer,
wherein the total traditional plasticizer and modifier plasticizer content in the formulation ranges from 5 phr to 40 phr, based on 100 parts of the PVC homopolymer or copolymer.

4. The luxury vinyl tile formulation of claim 3, wherein the total traditional plasticizer and modifier plasticizer content ranges from about 15 phr to about 30 phr, based on 100 parts of the PVC homopolymer or copolymer.

5. The luxury vinyl tile formulation of claim 4, wherein the traditional plasticizer is present in an amount that is 60% of the total traditional plasticizer and modifier plasticizer content and the modifier plasticizer is present in an amount that is 40% of the total traditional plasticizer and modifier plasticizer content for the formulation.

6. The luxury vinyl tile formulation of claim 3, wherein the traditional plasticizer is present in an amount that is 60% of the total traditional plasticizer and modifier plasticizer content and the modifier plasticizer is present in an amount that is 40% of the total traditional plasticizer and modifier plasticizer content for the formulation.

7. A method for increasing hardness or stiffness of luxury vinyl tile, comprising the steps of:
adding a modifier plasticizer selected from the group consisting of diethylene glycol dibenzoate, dipropylene glycol dibenzoate, 1,2-propylene glycol dibenzoate, and mixtures thereof to a luxury vinyl tile formulation comprising a traditional plasticizer and polyvinyl chloride homopolymer or copolymer,
wherein the traditional plasticizer is selected from dioctyl terephthalate, diisononyl phthalate, and diisononyl cyclohexane-1,2-dicarboxylate;
and
processing the formulation into a final layer or product whereby the final layer or product has a Shore D hardness that increases as compared to a final layer or product without the modifier plasticizer.

8. A luxury vinyl tile having a wear layer and a base layer, comprising:
a. a polyvinyl chloride homopolymer or copolymer present in the wear and the base layers,
b. a filler in the base layer;
c. a traditional plasticizer in both the wear and the base layers, wherein the traditional plasticizer is selected from dioctyl terephthalate, diisononyl phthalate, and diisononyl cyclohexane-1,2-dicarboxylate; and d. a modifier plasticizer that is different from the traditional plasticizer, the modifier plasticizer selected from the group consisting of diethylene glycol dibenzoate, dipropylene glycol dibenzoate, 1,2-propylene glycol dibenzoate, and mixtures thereof in either or both of the wear and the base layers, wherein the total traditional plasticizer content and modifier plasticizer content in each layer ranges from 5 phr to 40 phr based on 100 parts of the polyvinyl chloride homopolymer or copolymer.

9. The luxury vinyl tile of claim 8, wherein the modifier plasticizer is present in an amount of 40% and the traditional plasticizer is present in an amount of 60% of the total of the traditional plasticizer content and the modifier plasticizer content for the wear layer, the base layer, or both.

10. The luxury vinyl tile of claim 9, wherein the traditional plasticizer is dioctyl terephthalate (DOTP) and the modifier plasticizer is 1,2 propylene glycol dibenzoate (PGDB).

11. The luxury vinyl tile claim 8, wherein the traditional plasticizer is dioctyl terephthalate (DOTP) and the modifier plasticizer is 1,2 propylene glycol dibenzoate (PGDB).

12. A luxury vinyl tile comprising:
   a. a wear layer comprising:
      i. a PVC homopolymer or copolymer,
      ii. a traditional plasticizer, wherein the traditional plasticizer is selected from dioctyl terephthalate, diisononyl phthalate, and diisononyl cyclohexane-1,2-dicarboxylate,
      iii. a modifier plasticizer that is different from the traditional plasticizer and selected from the group consisting of diethylene glycol dibenzoate, dipropylene glycol dibenzoate, 1,2-propylene glycol dibenzoate, alkyl sulfonic phenyl ester, benzyl butyl 1,2-cyclohexyldicarboxylate, and mixtures thereof; and
      ii. a heat stabilizer, and
   b. a base layer comprising:
      i. a PVC homopolymer or copolymer,
      ii. a traditional plasticizer wherein the traditional plasticizer is selected from dioctyl terephthalate, diisononyl phthalate, and diisononyl cyclohexane-1,2-dicarboxylate,
      iii. a modifier plasticizer that is different from the traditional plasticizer and comprising diethylene glycol dibenzoate, dipropylene glycol dibenzoate, 1,2-propylene glycol dibenzoate, or mixtures thereof, or an alkyl sulfonic phenyl ester, dibutyl terephthalate, or benzyl butyl 1,2-cyclohexyldicarboxylate,
      iv. a heat stabilizer,
      v. a dispersant, and
      vi. a lubricant,
   wherein the amounts of the traditional plasticizer and the modifier plasticizer used in the wear layer or the base layer total 100% of the total plasticizer load for each layer, and
   wherein the traditional plasticizer is present in amounts ranging from about 60 to about 91% and the modifier plasticizer is present in amounts ranging from about 9% to about 40% of the total plasticizer load in each layer.

13. The luxury vinyl tile of claim 12, wherein the traditional plasticizer in the wear layer, the base layer, or both the wear layer and the base layer is dioctyl terephthalate (DOTP) and the modifier plasticizer in the wear layer, the base layer, or both the wear layer and the base layer is benzyl butyl 1,2-cyclohexyldicarboxylate.

14. The luxury vinyl tile of claim 12, wherein the modifier plasticizer is 1,2-propylene glycol dibenzoate.

15. A method for increasing hardness or stiffness of luxury vinyl tile, comprising the steps of:
   adding a modifier plasticizer comprising diethylene glycol dibenzoate, dipropylene glycol dibenzoate, 1,2-propylene glycol dibenzoate, or mixtures thereof, or an alkyl sulfonic phenyl ester, or benzyl butyl 1,2-cyclohexyldicarboxylate to a luxury vinyl tile formulation that comprises polyvinyl chloride homopolymer or copolymer and a traditional plasticizer selected from dioctyl terephthalate, diisononyl phthalate, and diisononyl cyclohexane-1,2-dicarboxylate,
      wherein the modifier plasticizer is present in an amount 2 phr to about 35 phr, based on 100 parts of the polyvinyl chloride homopolymer or copolymer; and
   processing the formulation into a final layer or product, whereby the final layer or product has a Shore D hardness at 10 seconds that increases as compared to a final layer or product without the modifier plasticizer.

16. The method of claim 15, wherein the traditional plasticizer is dioctyl terephthalate (DOTP).

* * * * *